United States Patent
Statton et al.

(10) Patent No.: US 12,542,824 B2
(45) Date of Patent: Feb. 3, 2026

(54) SEAMLESS AUTOMATIC REPEAT REQUEST (ARQ) CONTENT STREAMING

(71) Applicant: Amazon Technologies, Inc., Seattle, WA (US)

(72) Inventors: Evan Gerald Statton, Denver, CO (US); Bryan Michael Samis, Freelton (CA); Michael Henry, Bend, OR (US); Ryan Paul Hegar, Happy Valley, OR (US); Sydney Dean Lovely, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 18/193,559

(22) Filed: Mar. 30, 2023

(65) Prior Publication Data
US 2024/0333789 A1    Oct. 3, 2024

(51) Int. Cl.
*H04L 67/1008*    (2022.01)
*H04L 1/18*    (2023.01)
*H04L 67/1021*    (2022.01)

(52) U.S. Cl.
CPC ............ *H04L 67/1008* (2013.01); *H04L 1/18* (2013.01); *H04L 67/1021* (2013.01)

(58) Field of Classification Search
CPC ............ H04L 67/1008; H04L 67/1021; H04L 67/1027; H04L 67/1034; H04L 1/18; H04L 1/1825; H04L 1/1812
See application file for complete search history.

(56) References Cited

U.S. PATENT DOCUMENTS 6,195,680 B1    2/2001    Goldszmidt et al.
7,590,889 B1 *  9/2009    Maxemchuk ....... H04L 12/1868
                                                            714/748

(Continued)

FOREIGN PATENT DOCUMENTS

WO    WO 2024/205996 A1    10/2024

OTHER PUBLICATIONS

International Search Report and Written Opinion mailed Jul. 8, 2024 in International Application No. PCT/US2024/020572.

*Primary Examiner* — Nam T Tran
(74) *Attorney, Agent, or Firm* — Knobbe, Martens, Olson & Bear, LLP

(57) ABSTRACT

Systems and methods for providing a seamless automatic repeat request (ARQ) stream are provided. The system can include a plurality of streaming servers, a load balancer, and an ARQ streaming service. The ARQ streaming service obtains encoded content segments and transmits the segments to a plurality of streaming servers. The plurality of streaming servers is configured to transmit the encoded content segments to a client computing device, and a load balancer is implemented between the client computing device and the plurality of streaming servers. When the client computing device sends a response message to the ARQ streaming service while receiving the encoded content segments from one of the plurality of streaming servers, the ARQ streaming service may identify a failure in the streaming server. The ARQ streaming service retransmits lost encoded content segments by switching the streaming path to another streaming server from the plurality of streaming servers.

21 Claims, 11 Drawing Sheets

(56) References Cited

U.S. PATENT DOCUMENTS

| | | | |
|---|---|---|---|
| 8,806,287 B1 | 8/2014 | Jain et al. | |
| 2002/0114283 A1* | 8/2002 | Lee | H04L 1/1812 |
| | | | 370/282 |
| 2005/0204242 A1* | 9/2005 | Chou | H04L 1/007 |
| | | | 714/741 |
| 2006/0080454 A1* | 4/2006 | Li | H04L 67/1008 |
| | | | 709/231 |
| 2007/0058627 A1* | 3/2007 | Smith | H04L 67/1034 |
| | | | 370/390 |
| 2007/0255993 A1* | 11/2007 | Yap | H04L 1/1822 |
| | | | 714/748 |
| 2009/0210765 A1* | 8/2009 | Henocq | H04L 1/1806 |
| | | | 714/748 |
| 2010/0260180 A1* | 10/2010 | Wu | H04L 1/1819 |
| | | | 370/390 |
| 2017/0034545 A1* | 2/2017 | Rozenberg | H04N 21/2402 |

* cited by examiner

SEAMLESS AUTOMATIC REPEAT REQUEST (ARQ) CONTENT STREAMING

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as an original content provider.

The original content provider may provide content to a client, where the client can be provided via a streaming channel. The content, for example, can include any media content, such as video, audio, image, and the like, provided by the original content provider. In some embodiments, a service provider may provide or configure computing resources (e.g., network computing device resources such as CPUs, GPUs, or servers) to provide the streaming channel. The service provider can be referred to as a streaming service provider or any service provider that can utilize its resources to transmit the content from the original content provider to the client via the streaming channel.

To provide content, such as video media, via a streaming channel, the service provider can encode content to be provided to requesting client computing devices as a set of encoded content segments transmitted in accordance with a streaming protocol. In accordance with traditional streaming protocols, the set of encoded content is transmitted to client computing devices. In response, the client computing devices simply transmit individual requests for the encoded content segments based on the received encoded content segments.

In these embodiments, the service provider executes the instructions with consideration of efficiency in using the network-based computing device resources and the cost associated with the resource usage. For example, for larger scale implementations, a service provider may receive a high volume of requests for original content, such as popular television shows or sports programs, that may require a higher degree of unique processing of different secondary event data, such as region-based secondary event data. Such server-side processing of the generation of the encoded content segments, including secondary event data, can increase the strain on the service provider's computing resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
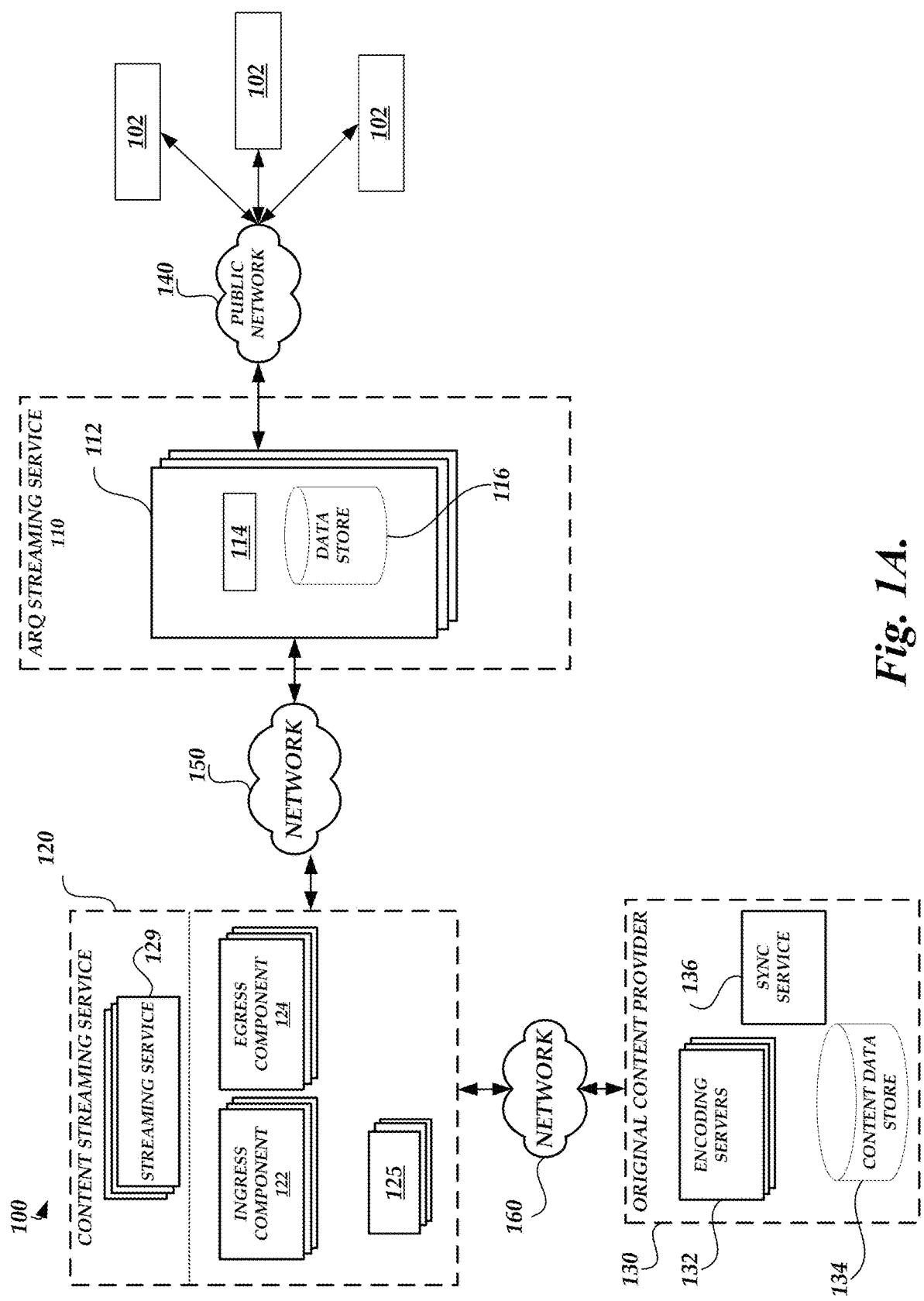
FIG. 1A is a block diagram of a content delivery environment that includes one or more client computing devices, an automatic repeat request (ARQ) streaming service, a content streaming service, and an original content provider according to one or more embodiments.

In the following description, various examples will be described. For purposes of explanation, specific configurations and details are set forth in order to provide a thorough understanding of the examples. However, it will also be apparent to one skilled in the art that the examples may be practiced without specific details. Furthermore, well-known features may be omitted or simplified in order not to obscure the examples being described.

Generally described, aspects of the present disclosure relate to systems and methods for providing a seamless content streaming service. More specifically, aspects of the present application related to a seamless automatic repeat request (ARQ) streaming service by minimizing the ARQ streaming latency and efficiently utilizing the network resources. Illustratively, a content streaming service can receive original content from a content service provider(s), which can be processed in various bitrate/format combinations for transmission to client computing devices in accordance with a streaming protocol. The result can be one or more sets of encoded content segments corresponding to the original content received from the original content provider. Under traditional ARQ streaming approaches, when one or more encoded segments are lost in the content streaming channel (e.g., the streaming channel that the content streaming service transmits the encoded segments to the client computing device), the content streaming service would require additional network resources to further process the lost encoded segments to retransmit the lost encoded content segments. The segment is intended to refer to the packet of the encoded content.

The ARQ streaming, as disclosed herein, can be used to transmit the content to the client computing device with ensuring content delivery reliability. For example, when content is transmitted from the original content provider to the client computing device, the content can be provided as encoded content segments over a network. More specifically, a content streaming service can receive original content from an original content provider, generate encoded content segments by processing the received original content in various bitrate/format combinations, and transmit the encoded content segments to client computing devices in accordance with a streaming protocol. Illustratively, the encoded content segments are identified, otherwise referenced, according to a shared streaming content identification. The shared streaming content identification corresponds to an identification of a sequence of content segments that are utilized to compile the received content segments at a receiving computing device, such as a requesting client computing device. The ARQ stream service can be used to ensure that these segments are transmitted and received by the client computing devices. For example, the client computing device may confirm whether the client computing device received the encoded content segments by generating a responsive message. In this example, when the responsive message indicates that the client computing device did not receive one or more segments of the encoded content segments, the ARQ stream service may retransmit one or more segments that the client computing device did not receive. The responsive message may identify one or more content segments that are identified according to the shared streaming content identification.

Illustratively, in accordance with one or more aspects of the present application, a content service provider (e.g., a network service provider) may provide a seamless ARQ streaming service. In this illustration, the seamless ARQ streaming service may identify and cause the retransmission of lost encoded content segments. More specifically, in accordance with illustrative embodiments, in the event of a failure or other unavailability of an original content streaming server (e.g., a first streaming server), the retransmission of the lost encoded content segments can be provided by a second content streaming server (e.g., a second streaming server) based on the shared streaming content identification. For example, the ARQ streaming service may identify the lost encoded content segments by receiving a message from the client computing device. More specifically, when the client computing device receives the encoded content segments, the client computing device may generate a response message, such as a negative acknowledgment message (NACK) or acknowledgment message. For example, if the response message is the NACK message, the NACK message indicates one or more encoded content segments that the client computing device did not receive. These one or more encoded content segments can be referred to as lost encoded content segments. For example, if the response message is an acknowledgment message, the message may indicate the encoded content segments that the client computing device received from the ARQ streaming service. In this example, the ARQ streaming service may identify the lost encoded content segments by comparing the encoded content segments transmitted to the client computing device with the encoded content segments included in the acknowledgment message. In some embodiments, the ARQ streaming service receives the response message from the client computing device and identifies the lost encoded segments. In some embodiments, the ARQ streaming service may utilize another streaming server or instance to retransmit the lost encoded content segments without requesting the lost encoded contents to the original content provider and/or the content streaming service.

In accordance with one or more aspects of the present application, the ARQ streaming service can include at least two network streaming servers or instances to provide the seamless ARQ streaming service. The network streaming servers can receive the encoded content segments and transmit them to the client computing device. Illustratively, the network streaming servers can be configured to store the same temporarily stored encoded content segments in a buffer of the streaming servers. These temporarily stored encoded content segments in the buffer are generally referred to as buffer content or a set of buffer content. In some examples, this can be further managed based on a common amount of storage for the buffer contents, which can be referred to as buffer size. Thus, one or more segments stored in the buffer of the streaming servers can be identified according to the shared streaming content identification. The common buffer contents can facilitate the availability of the encoded content segments for retransmission. For example, the network streaming servers receive the encoded content segments and temporarily store the received encoded content segments. Maintaining the same amount of buffer contents (e.g., the same buffer contents) across the streaming servers is advantageous because when one of the streaming servers is transmitting the encoded content segments, and a failure occurs in the streaming server, another streaming server can retransmit any lost encoded content segments because these two streaming servers have the same buffer contents (e.g., same stored encoded content segments in the buffer).

In accordance with one or more aspects of the present application, the seamless ARQ streaming service can include at least one load balancer. The load balancer can be implemented between the network streaming servers and the client computing device. Illustratively, the load balancer (e.g., network load balancer) configures the network connection between one of the streaming servers and the client computing device. For example, when one of the streaming servers, transmitting the encoded content segments to the client computing device, is failed (e.g., hardware failure, power outages, etc.), the load balancer may automatically reconfigure the network connection with another streaming server that can retransmit the encoded content segments to the client computing device. In some embodiments, the load balancer configures one of the streaming servers to transmit the encoded content segments based on a predefined rule. The predefined rule, for example, can be based on each streaming server's capacity, traffic, history of failure, performance degradation, etc. The load balancer, as disclosed herein, can also be a domain name service (DNS) based load balancer implemented at the front end of the network (e.g., client-side). The domain name can be associated with one or more IP addresses. Each of the IP addresses can correspond to a network streaming server or instance. Illustratively, each of the IP addresses can be connected to a streaming server, such as a DNS streaming server. For example, if a client computing device receives the encoded content segments via an internet domain, a list of network streaming servers associated with the domain's name can be utilized to transmit the encoded content segments to the computing device. For example, the load balancer may configure one of the streaming servers to transmit the encoded content segments, and when the streaming server has failed (or is characterized as failing or having failed), the load balancer may configure the network connection with another streaming server corresponding to the domain name.

In accordance with one or more aspects of the present application, the seamless ARQ streaming service can include clusters of network streaming servers or instances. The cluster of streaming servers can be configured to transmit the encoded content segments based on their role. For example, one cluster of streaming servers can be configured to transmit the encoded content segments from the content service provider (e.g., configured to encode the original content) to the client computing device. Another cluster of streaming servers may receive response message(s) from the client computing device. For example, the response message can be the NACK or acknowledgment message and may indicate any lost encoded content segments or confirm the received encoded content segments. In this example, upon receiving the response message that indicates lost encoded content segments, the cluster of streaming servers may identify and retransmit the lost encoded content segments to the client computing device.

In accordance with one or more aspects of the present application, the ARQ streaming service can efficiently retransmit the lost encoded content segments by minimizing latency or delay. For example, the content service provider may provide encoded content segments transmitted from a region to edge locations where the edge locations are geographically closer to the client computing device. Each edge location can include a streaming server and maintains the same buffer in the streaming server located in the region. Advantageously, since the edge locations are closer to the client computing device, when the client computing device indicates lost encoded content segments, one of the streaming servers in the edge locations can retransmit the lost encoded content segments. Thus, the latency or delay caused by the geographic distance from the client computing device can be minimized because the edge locations are closer to the client computing device, and one of the edge locations can retransmit the lost encoded content segments without requiring data communication to the streaming server located in the region.

Illustratively, the content streaming service indexes the set of encoded content segments (either live streaming or file-based video-on-demand) and processes it for delivery to clients via a wide range of communication protocols such as HTTP Live Streaming ("HLS"), Dynamic Adaptive Streaming over HTTP ("DASH"), HTTP Dynamic Streaming ("HDS"), Real-Time Messaging Protocol ("RTMP"), Smooth Streaming, and the like. Based on consumer demand, a content streaming service can also provide advanced video transmission features such as just-in-time packaging of video content, digital rights management ("DRM") encryption, time-shifting, bitrate selection, catch-up TV, and more. Illustratively, individual portions of the encoded content may be referred to as content segments. In other examples, individual portions of the encoded content may also be referred to as data packet(s). Accordingly, reference to content segments, data packets, or any other measurement of portions of the content segments should not be limited to any particular type of segmentation/division of the content, nor any particular meaning be construed based on reference to segments, packets, or other similar terminology.

As described above, traditional ARQ streaming for retransmitting lost encoded content segments to the client computing device presents significant technical challenges for clients and content streaming service providers. More specifically, the content streaming service provider may encode the original content and provide the encoded segments to the client computing device. The client computing device may generate a response message that the message may indicate one or more lost encoded content segments (e.g., NACK message) or the encoded content segments received by the client computing device (e.g., acknowledgment message). In some aspects, the content streaming service provider may receive the response message and identify the lost encoded content segments. For example, the content streaming service provider may identify the lost encoded content segments, evaluate the health of streaming servers implemented in the content streaming service, and determine one of the streaming servers to transmit the encoded content segments to the client computing device. In these aspects, the content streaming service may retransmit the lost encoded content segments after fixing the streaming server. In some aspects, after identifying the lost encoded content segments, the original content provider may need to retransmit the content to the content service provider. In these aspects, the content service provider may need to re-encode the original content and retransmit the lost encoded content segments.

In one aspect, the content streaming service provider can have a challenge in providing a seamless network connection between the client computing device and its network resources configured to provide the encoded content segments. For example, when a streaming server is implemented in the content streaming service fails, the content streaming service provider may require additional time to fix the streaming server before retransmitting the lost encoded content segments. For example, when a failure occurs in a streaming server utilized to transmit the encoded content segments to the client computing device, the content streaming service provider may need additional time to fix the streaming server before retransmitting the lost encoded content segments and the remaining encoded content segments. Thus, the content streaming service provider may not provide a seamless content transmission to the client computing device. Furthermore, the client computing device may experience a time delay or latency in receiving the content streaming from the content streaming service provider.

In another aspect, the content streaming service provider may have a challenge in efficiently utilizing its resources in retransmitting the lost encoded content segments to the client computing device. In this aspect, when the client computing device generates a message indicating the lost encoded content segments, the content streaming service provider may need to identify the lost encoded contents, request the lost encoded contents, and store the encoded content segments before retransmitting the segments to the client computing device, etc. For example, the content streaming service provider may request the original content provider to retransmit the original content and re-encode the original content to identify the lost encoded content segments. In other examples, while the streaming server is experiencing failure, the content streaming service provider may need to utilize additional storage to store the encoded content segments. Thus, for the original content provider side, the original content provider may need to additionally utilize its resources to retransmit the content to the content streaming service provider. Furthermore, the content streaming service provider may need to additionally utilize its resources to re-encode the content and identify the lost encoded content segments.

To address at least a portion of the above-described deficiencies, one or more aspects of the present disclosure correspond to systems and methods for a seamless ARQ streaming service. More specifically, aspects of the present disclosure correspond to the implementation of multiple encoded content segment transmission paths between a content streaming service and a client computing device to provide a seamless ARQ streaming service. Illustratively, the ARQ streaming service may include multiple streaming servers (or instances), and each streaming server can be utilized to transmit the encoded content segments to the client computing device. In this illustration, the ARQ streaming service may receive a response message acknowledgment message from the client computing device. The message may indicate one or more lost encoded content segments (e.g., NACK message) or the encoded content segments received by the client computing device (e.g., acknowledgment message). Then, the ARQ streaming service may automatically switch the failed streaming server with another streaming server to retransmit the lost encoded content segments. For example, the ARQ streaming service may initially utilize one of the streaming servers to transmit the encoded content segments, and if a failure occurs in the streaming server, the ARQ streaming service may utilize another streaming server to retransmit the lost encoded content segments. Thus, the ARQ streaming service can seamlessly retransmit the lost encoded content segments by switching to another streaming server.

In some embodiments, the ARQ streaming service may include multiple streaming servers (or instances), and each streaming server can be configured as an ARQ streaming channel to transmit the encoded content segments to the client computing device. These streaming servers can include the same buffer content (e.g., temporarily stored encoded content segments for the purpose of buffering), and thus, the ARQ streaming service can seamlessly transmit any lost encoded content segments by utilizing one of the streaming servers. For example, when the ARQ streaming service receives a response message that indicates one or more lost encoded content segments (e.g., NACK message) or the encoded content segments received by the client computing device (e.g., acknowledgment message), the ARQ streaming service may identify the lost encoded content segments and switch to a secondary streaming server to retransmit the lost encoded content segments without delay. In this example, since the secondary streaming server also has the same buffer contents as the other streaming servers in the ARQ streaming service, these streaming servers temporarily store the same amount of the encoded content segments. The same amount of the encoded content segments is intended to refer to the same temporarily stored encoded content segments. For example, if the lost encoded segments indicate time information, such as the segments corresponding to the time duration between 31:24 (minutes:second)-31:26, the secondary streaming server can identify the time corresponding to the time duration and retransmit the lost encoded segments corresponding to the time duration by accessing to its buffer. The secondary streaming server can perform this retransmission of the lost encoded segments based only on the time information because the secondary streaming server has the same buffer contents as the initially utilized streaming server to transmit the encoded content segments.

In some embodiments, the ARQ streaming service may monitor the health status of the streaming servers. In these embodiments, when the client computing device transmits a response message that indicates one or more lost encoded content segments (e.g., NACK message) or the encoded content segments received by the client computing device (e.g., acknowledgment message), the ARQ streaming service may identify the lost encoded content segments. Then, the ARQ streaming service may automatically switch to another streaming server based on the monitoring results of the streaming servers. Monitoring the streaming servers may include monitoring CPU usage, memory usage, network traffic, disk usage, and other performance indicators. The ARQ streaming service may also monitor the streaming servers based on historical usage of the streaming servers, such as failure of the streaming servers, performance patterns of the streaming servers, analyzing log data, etc.

In some embodiments, the ARQ streaming service may configure a network connection between the ARQ streaming service and the client computing device by implementing a load balancer. In these embodiments, the load balancer can be configured to transmit the encoded content segments by selecting one streaming server from the streaming servers implemented in the ARQ streaming service. In some embodiments, the load balancer may perform the monitoring aspect of the ARQ streaming service and automatically switch the streaming server when the ARQ streaming service identifies lost encoded content segments from the received response message from the client computing device that indicates one or more lost encoded content segments (e.g., NACK message) or the encoded content segments received by the client computing device (e.g., acknowledgment message). In some embodiments, the load balancer can be associated with a public IP address and provide a list of private IP addresses corresponding to the public IP address. For example, the load balancer may include a list of private IP addresses, where each private IP address is associated with a streaming server included in the ARQ streaming service. In this example, if the ARQ streaming service includes three streaming servers, each streaming server is associated with a private IP address of the load balancer and connected to the load balancer via the socket of the load balancer. The load balancer may utilize a public IP address associated with the list of private IP addresses of the load balancer to transmit the encoded content segments to the client computing device. For example, the client computing device may receive the encoded content segments and transmit NACK message, indicating lost encoded content segments, via the public IP address associated with the load balancer. In this example, the load balancer may switch the streaming server by switching the private IP address associated with the streaming server. For example, the load balancer may select a different private IP address (or associated socket) to switch the streaming server and transmit the lost encoded content segments via the switched streaming server (or private IP address).

Although aspects of the present disclosure will be described with regard to illustrative network components, interactions, and routines, one skilled in the relevant art will appreciate that one or more aspects of the present disclosure may be implemented in accordance with various environments, system architectures, external computing device architectures, and the like. Similarly, references to specific devices, such as a client computing device, can be considered to be general references and not intended to provide additional meaning or configurations for individual external computing devices. Additionally, the examples are intended to be illustrative in nature and should not be construed as limiting.

FIG. 1A illustrates a general content delivery environment 100 for delivering content from original content providers 130 to client computing devices 102. The content delivery environment 100 includes a plurality of client computing devices 102 utilized by individual clients, generally referred to as client computing devices, to request streaming or download content from a content streaming service 120. Illustratively, the content streaming service 120 can correspond to one or more services utilized in the transmission of the encoded content to the client computing device 102. The content streaming service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a content streaming service can also provide advanced video transmission features such as just-in-time packaging of video content, digital rights management ("DRM") encryption, time-shifting, bitrate selection, catch-up TV, and more. In addition, the content streaming service 120 may include manifest data. The content streaming service 120 can receive the manifest data with the original contents, and the manifest data may include encoding information, such as the information about various bitrates or resolutions available for streaming the content. The content can be illustratively provided by one or more origin sources, such as original content provider 130.

Client computing devices 102 may include any number of different computing devices capable of communicating with the networks 140, 150, 160, via a direct connection or via an intermediary. For example, individuals accessing computing devices may correspond to laptops or tablets, personal computers, wearable computers, mobile phones, streaming servers, and the like. Each client computing device 102 may include one or more data processors, such as CPU and GPU to execute and process instructions used to execute the embodiments disclosed herein. For example, each client computing device 102 can monitor the received encoded content segments and provide response message to the ARQ streaming service 110. For example, the response message may indicate one or more lost encoded content segments (e.g., NACK message) or the encoded content segments received by the client computing device (e.g., acknowledgment message). Based on the response message, the ARQ streaming service 110 may identify the lost encoded content segments.

In some embodiments, an ARQ streaming service 110 may include multiple edge locations from which a client computing device can retrieve content. Individual edge location 112 may be referred to herein as an edge component. The edge component can refer to the point of presence ("POP"), edge node, local not, etc., where the edge component can be referred to as a streaming server utilized to implement functionality on behalf of one or many providers. The present application does not limit the type, function, quantity, etc., of the edge component. The edge component can be configured to transmit the encoded content segments generated from the content streaming service 120. The edge components are generally associated with a specific geographic location in which the computing devices implementing the edge component are located or with a region serviced by the edge component. As illustrated in FIG. 1A, the POP 112 can include one or more ARQ information processing components 114 for processing encoded content segments in response to receiving a response message from client computing devices 102 and a data store 116 for maintaining buffer contents received from the content streaming service 120. For example, a data center or a collection of computing devices within a data center may form an edge component 112. In some instances, the edge components 112 may implement one or more services, such as data storage and data processing. The ARQ streaming service 110 may include multiple edge components located in different geographic locations so that client computing devices can communicate with a nearby edge component to retrieve content, thereby reducing the latency of delivering requested content.

Networks 140, 150, 160 may be any wired network, wireless network, or a combination thereof. In addition, the networks 140, 150, 160 may be a personal area network, local area network, wide area network, cable network, fiber network, satellite network, cellular telephone network, data network, or a combination thereof. In the example environment of FIG. 1A, network 140 can be a global area network (GAN), such as the Internet. Protocols and components for communicating via the other aforementioned types of communication networks are well known to those skilled in the art of computer communications and, thus, need not be described in more detail herein. Accordingly, communication times and capabilities may vary between the components of FIG. 1A.

A content streaming service 120 may include one or more streaming servers for receiving content from original content providers 130 and processing the content to make available a set of received encoded bitrate segments, such as via a video packaging and origination service. In addition, the components of the content streaming service 120 may provide the encoded content to separate stand-alone services, such as content streaming service, for subsequent transmission to client computing devices 102 or the ARQ streamlining service 110. In other embodiments, the illustrated components of the content streaming service 120 may be integrated or form a part of a content streaming service environment. Accordingly, the term content streaming service 120 may generally be variable and is not limited to any particular implementation.

The content streaming service 120 may include one or more ingress components 122 (e.g., "decoders" or "decoding nodes") utilized to receive encoded data streams from encoders 132 from original content providers 130. Illustratively, the ingress components 122 can process the incoming encoded content from the original content providers 130. The content streaming service 120 also includes one or more egress components 124 (e.g., "encoders" or "encoding nodes") encoding decoded content into a bitrate and format for delivery to client computing devices. The ingress components 122 and egress components 124 may be distributed according to geographic criteria or availability zones to facilitate delivery or access to encoded content. Additionally, although the ingress components 122 and egress components 124 are illustrated as separate components, in some embodiments, one or more computing devices 102 may be configured to implement the functionality associated with both the ingress components 122 and egress components 124. An illustrative configuration of ingress components 122 (decoding nodes) and egress components 124 (encoding nodes) will be illustrated in greater detail with regard to FIG. 1B.

The content streaming service 120 also includes a plurality of streaming service 129 corresponding to a content streaming component for establishing individual communication channels with the client computing device 102. Each streaming service 129 can correspond to an individual client computing device 102, groupings of client computing devices 102 (e.g., by household or region), or combinations thereof. Illustratively, in one embodiment, the content streaming service 129 can correspond to a separate service that is independent of a different service incorporating the ingress components 122 and egress components 124.

The content streaming service 129 can further identify instructions received from the original content provider 130 and process the identified instructions to include the instructions in manifest data associated with the communication protocol. For example, various communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like can be used, and the form of the manifest data is determined based on one of the communication protocol used in the content streaming service 129. In some embodiments, the instructions are transmitted from the original content provider 130.

It will be appreciated by those skilled in the art that the content streaming service 120 may have fewer or greater components than are illustrated in FIG. 1A. Thus, the depiction of the content streaming service 120 in FIG. 1A should be taken as illustrative. For example, in some embodiments, components of the content streaming service 120 may be executed by one more virtual machine implemented in a hosted computing environment. A hosted computing environment may include one or more rapidly provisioned and released computing resources, which computing resources may include computing, networking, or storage devices. Accordingly, while such components are illustrated as logically being logically grouped in FIG. 1A, one skilled in the relevant art will appreciate that one or more aspects of the present disclosure can include the content streaming service 120 as being implemented in multiple geographic areas. Additionally, not all geographic regions hosting portions of the content streaming service 120 will necessarily have all the same components or a combination of components. Accordingly, the illustrated relationship in FIG. 1A is only logical in nature.

With continued reference to FIG. 1A, the content delivery environment 100 also includes original content providers 130. Illustratively, the original content provider can include a plurality of encoders 132 for generating multiple encoded streams for transmission to the content streaming service 120. In some embodiments, the original content provider 130 may include the instructions associated with original contents and provide the instructions with the associated original contents to the content streaming service 120. In one embodiment, individual encoders may generate different encoded versions of a content segment according to a different encoding profile. The original content provider 130 can also include logic or other management components for determining how many encoders 132 should be utilized or how to manage the addition or removal of encoders. In some embodiments, the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like.

The present application is not intended to be limited to any particular type of service or the number of individual components that may be accessed or generate processing results as part of an execution of an application on behalf of clients. Furthermore, the present application is not intended to limit the number of streaming services configured to transmit encoded contents or ingress/egress components that are configured to decode or encode the original contents provided by the original content provider 130.

Figure 1B:
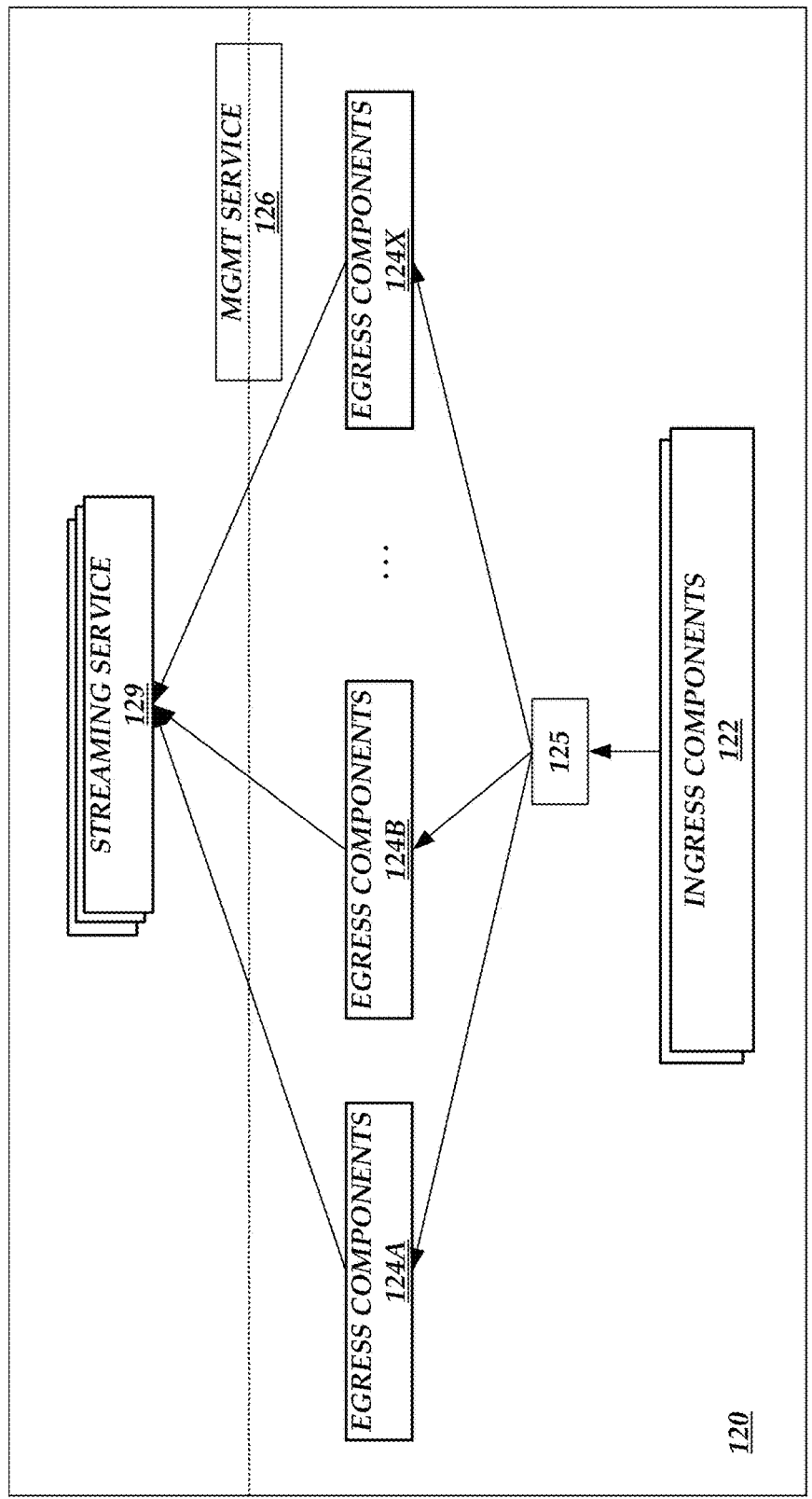
FIG. 1B is a block diagram of ingress components (decoding nodes), cache servers, egress components (encoding nodes), and streaming service according to one or more embodiments.

With reference now to FIG. 1B, an illustrative arrangement of ingress components 122 (decoding nodes), cache server 125, egress components 124 (encoding nodes), and content streaming service 129 will be described. As illustrated in FIG. 1B, one or more ingress components (decoding nodes) can receive (directly or indirectly) original content from original content providers 130. In some embodiments, the original content is encoded in a bitrate/format representing a higher (or highest) quality that will eventually be transmitted to requesting users by the content streaming service 120. The decoding nodes 122 will decode the content and store the unencoded nodes in a memory, such as a cache server 125 that is accessible to one or more encoding nodes 124. In a streaming embodiment, the decoding node continuously receives, decodes, and stores the original content. Additionally, the decoding nodes 122 can process multiple content streams from the same or different original content providers 130.

Once unencoded content is available at the cache server 125 (or other memory), one or more encoding nodes 124 will access the unencoded content and begin generating encoded content. Individual encoding nodes can be configured to encode content according to different encoding bitrate/format combinations. In other embodiments, multiple encoding nodes 124A, 124B . . . 124X may be configured to encode the same content according to the same encoding bitrate/format combination to represent redundant or duplicative encoded content streams. In other embodiments, the encoding nodes 124A, 124B . . . 124X may access different unencoded content such that there is no overlap, commonality, or overlap in the generated encoded content.

Figure 1C:
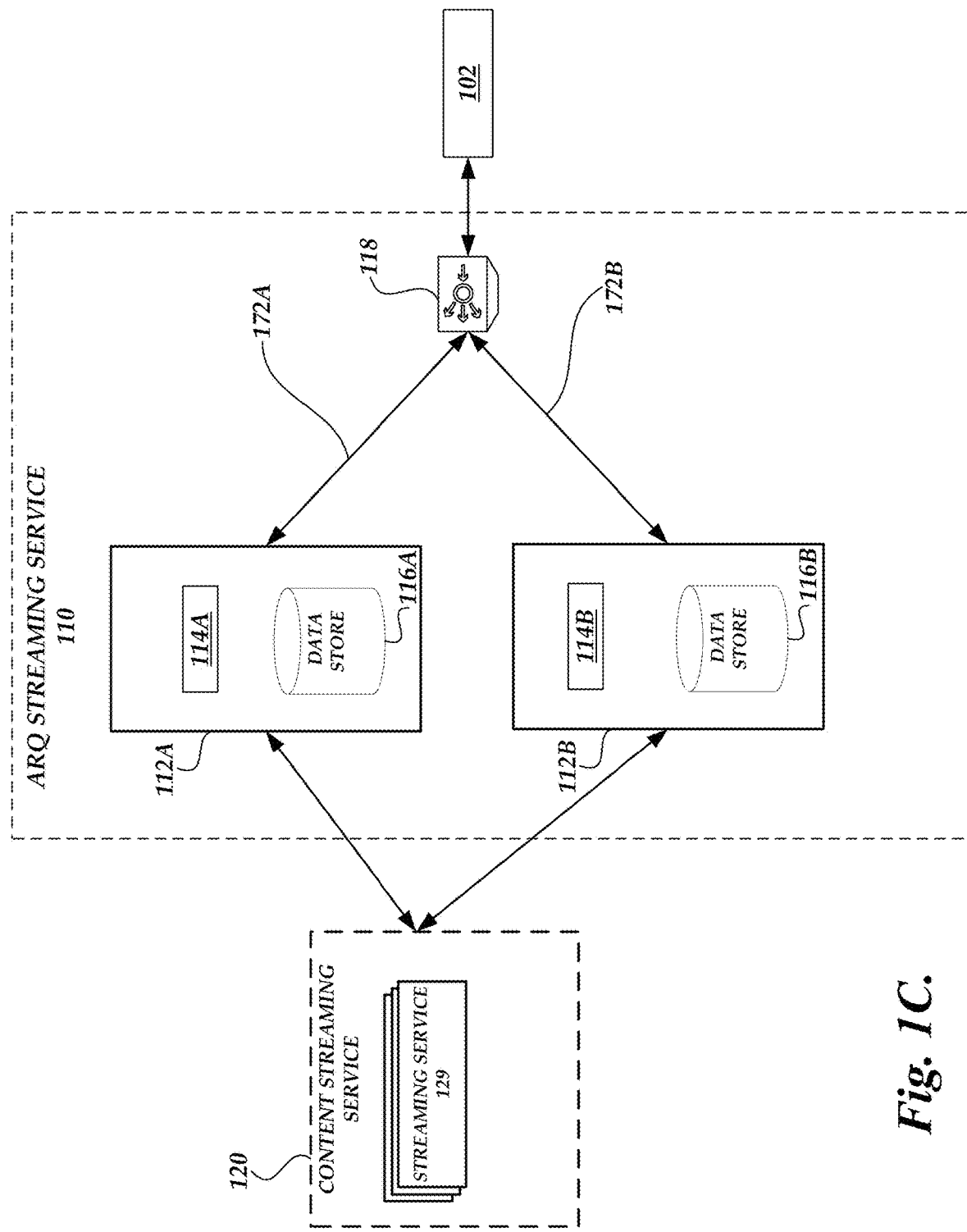
FIG. 1C depicts a block diagram of a content delivery environment implementing the ARQ streaming service according to one or more embodiments.

FIG. 1C depicts one embodiment of an architecture of an illustrative content delivery environment 100 implementing the ARQ streaming service 110, according to one or more embodiments as disclosed herein. In some embodiments, the ARQ streaming service 110 can include multiple edge components 112A, 112B. The individual edge components 112A, 112B can implement hardware and/or software to implement functionality on behalf of one or many providers. For example, the individual edge components 112A, 112B can include one or more streaming servers, routers, or any networking equipment that can be configured to transmit the encoded content segments generated from the content streaming service 120 or temporarily store one or more encoded content segments. The present application does not limit the number and types of the edge components. For the purpose of examples and illustrations, the present application, hereinafter, refers to the edge components as streaming servers. The streaming servers 112A, 112B may include the data store 116A, 116B, respectively. In some embodiments, the data store 116A, 116B can be configured to store metadata, such as historically transmitted encoded content segments, manifest, etc. The data store 116A, 116B can also include a buffer to store one or more encoded content segments temporarily. In some embodiments, the ARQ streaming service 110, in response to identifying one or more lost encoded content segments that the client computing device 102 did not receive, may access the buffer of the data store 116A, 116B to retransmit the one or more segments. In some embodiments, each of the data store 116A, 116B can store the same amount of encoded content segments in their buffer. In some embodiments, the streaming servers 112A, 112B receives encoded content segments generated from the content streaming service 110, as described in FIG. 1B. For example, the streaming service 129 may encode the original content into segments and transmit the encoded content segments to the streaming servers 112A, 112B. In some embodiments, the content streaming service 120 may transmit the encoded content segments based on a time sequence. For example, each segment of the encoded content segments can include a time stamp. In these embodiments, each streaming server 112A, 112B, upon receiving the encoded content segments, may temporarily store a number of encoded content segments in the data store 116A, 116B. The data store 116A, 116B may temporarily store the same number of the encoded content segments, and the number of buffer contents (e.g., temporarily stored encoded content segments) can be determined based on the type of content, network environment, the health status of the servers, etc.

As depicted in FIG. 1C, in some embodiments, the ARQ streaming service 110 further includes a load balancer 118. The load balancer 118 can provide functionality related to a seamless connection to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and one of the streaming servers 112A, 112B by enabling or disabling streaming channels 172A, 172B. For example, the load balancer 118 may enable the streaming channel 172A and disable the streaming channel 172B. In this example, the client computing device 102 can receive the encoded content segments from the streaming server 112A. However, if a failure occurs in the streaming server 112A, the load balancer 118 may automatically enable the streaming channel 172B and disable the streaming channel 172A. In some embodiments, the load balancer 118 can monitor the health status of the streaming servers 112A, 112B, and perform a remedial action to provide a seamless content service. The health status of the streaming servers, for example, can include but is not limited to CPU usage, memory usage, disk space, network connectivity, bandwidth, response latency, level of traffic and loads, etc. For example, prior to transmitting the content to the client computing device 102, the load balancer 118 may monitor the health status of the streaming servers 112A, 112B and initially configure the network connection between the content streaming service 120 and the client computing device 102 based on the monitoring results of the health status of the streaming servers 112A, 112B. In another example, after the initial configuration, the load balancer 118 may continue to monitor the health status of the streaming servers 112A, 112B. In response to determining that a streaming server currently utilized to transmit the encoded content segments has a degraded health (e.g., degraded performance), the load balancer 118 may reconfigure the configuration by utilizing another streaming server with better health (e.g., higher performance). For example, the load balancer 118 may monitor the streaming servers 112A, 112B, while the streaming server 112A is transmitting the encoded content segments to the client computing device. The load balancer 118, in response to determining that the streaming server 112A has a degraded performance or any indicative performance metric of failure, the load balancer 118 may disable the streaming channel 172A and enable the streaming channel 172B as the remedial action.

In some embodiments, each streaming server 112A and 112B can be provided as a virtual computing environment. For example, each streaming server 112A and 112B can be accessed via designated IP addresses, and the load balancer 118 can configure the streaming channels 172A, 172B by utilizing the designated IP addresses. For example, the load balancer 118 can configure the streaming channel 172A by accessing to the IP addresses associated with the streaming server 112A.

In some embodiments, the load balancer 118 can be a domain name service (DNS) based network load balancer located in the front end of the network (e.g., client side). The domain name can be associated with one or more IP addresses. In these embodiments, the client computing device may receive the streaming service by accessing a public IP address associated with the DNS. Then, the load balancer 118 may configure the streaming channel 172A or 172B by calling a private IP address associated with each streaming server 112A or 112B.

In some embodiments, the ARQ streaming service 110 monitors the health status of the streaming servers 112A and 112B. In these embodiments, the health status of the streaming server may include but is not limited to monitoring CPU usage, memory usage, disk space, network traffic, streaming server uptime, etc. In some embodiments, the ARQ streaming service 110 may monitor the health status of the streaming servers 112A and 112B based on historical maintenance data of the streaming server. For example, if the streaming server 112A has historical maintenance data, such as that the streaming server 112A is failed after operating an average time of 100 hours, the ARQ streaming service 110 may monitor the streaming server 112A's uptime based on the 100 hours. For example, when the operating time of the streaming server 112A indicates about 90 hours, the ARQ streaming service 110 may predict that the streaming server 112A may have a failure after operating for about 10 hours. In some embodiments, the load balancer 118 may perform in part or all of the monitoring aspects of the ARQ streaming service 110.

In some embodiments, the client computing device 102 may transmit a response message to the ARQ streaming service 110 while receiving the encoded content segments. In some embodiments, the response message can be a negative acknowledgment message (NACK). The NACK can indicate that client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second). Thus, the ARQ streaming service 110 may need to retransmit the encoded content segments corresponding to the time duration between 33:05-33-08 (minutes:second).

In some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 receives the encoded content segments from the streaming server 112A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B.

In some embodiments, the ARQ information processing components 114A, 114B may identify the lost encoded content segments. In these embodiments, the ARQ information processing components 114A, 114B, upon identifying the NACK message received from the client computing device 102, may access to the data store 116A, 116B to identify the encoded content segments corresponding to the NACK message. For example, when the streaming server 112A is transmitting the encoded content segments to the client computing device 102, and the failure occurs in the streaming server 112A, the computing device 102 may generate the NACK by identifying the lost encoded content segments transmitted while the failure occurs in the streaming server 112A. In this example, the load balancer automatically switches the connection to the streaming server 112B by enabling the streaming channel 172B (and disabling the streaming channel 172A). Then, the ARQ information processing component 114B may identify the lost encoded content segments based on the time stamp associated with the lost encoded segments. For example, the NACK may provide specific time information that the client computing device 102 did not receive the encoded content segments. The ARQ information processing component 114B may access to the data store 116B and retransmit the encoded content segments corresponding to the specific time information.

The present application does not limit the type of acknowledgment message generated from the client computing device 102. For example, the acknowledgment message can represent the received encoded content segments. In this example, the ARQ streaming service 110, by utilizing the ARQ information processing components 114A, 114B may identify the lost encoded segments. The number of streaming servers 112 and load balancer 118, as described herein, is merely illustrative, and the present application does not limit the number of streaming servers 112 and load balancer 118.

Figure 2:
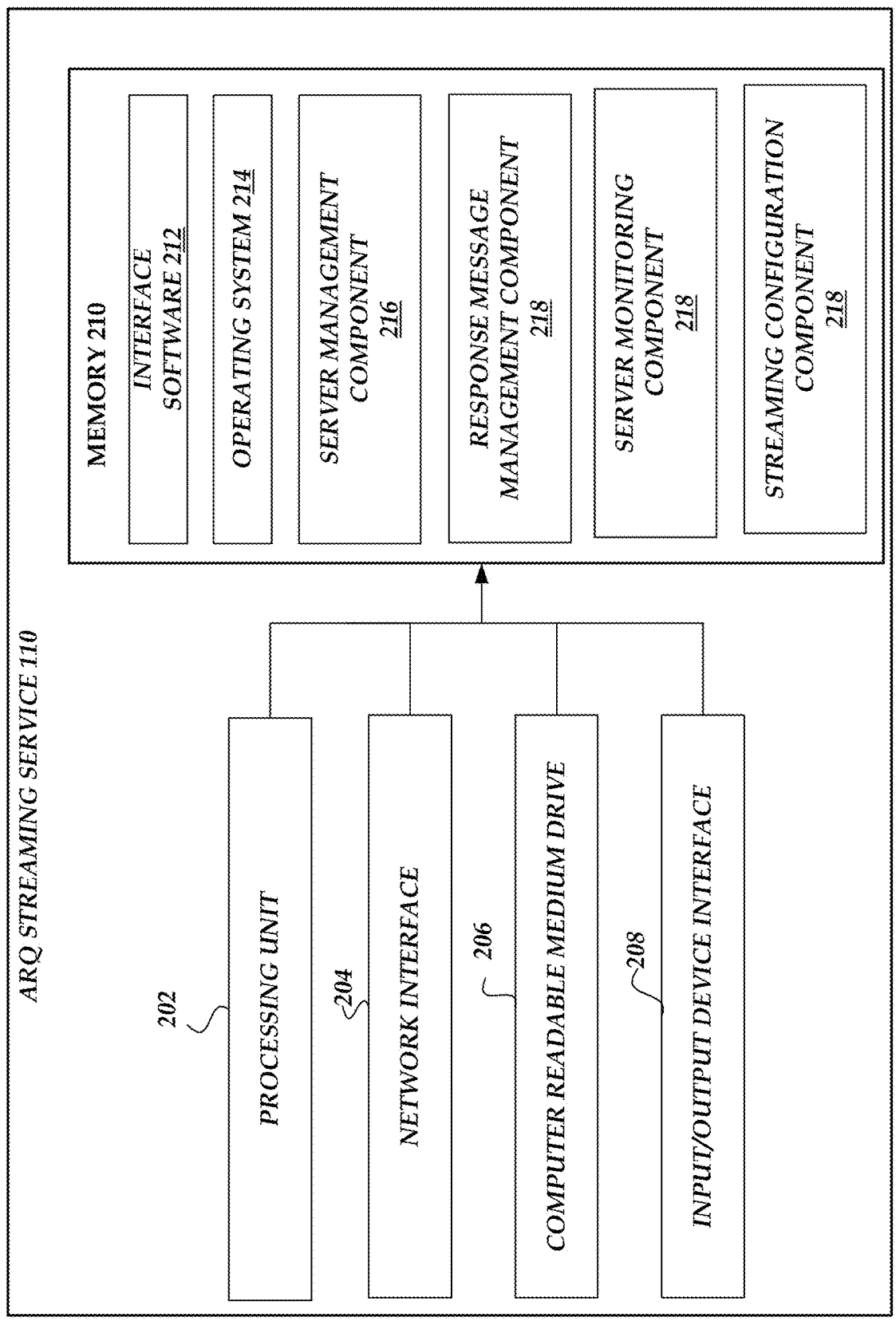
FIG. 2 depicts one embodiment of an architecture of an ARQ streaming service for providing seamless ARQ streaming according to one or more embodiments.

FIG. 2 depicts one embodiment of an architecture of an illustrative ARQ streaming service 110 for providing seamless ARQ streaming. In some embodiments, the ARQ streaming service 110 receives encoded content segments from the content streaming service 120 in FIG. 1A. The content streaming service 120 may process the incoming stream of encoded content segments or original encoded content and transmit it to the ARQ streaming service 110, where the client can download the encoded content segments. The general architecture of the ARQ streaming service 110 depicted in FIG. 2 includes an arrangement of computer hardware and software components that may be used to implement aspects of the present disclosure. As illustrated, the ARQ streaming service 110 includes a processing unit 202, a network interface 204, a computer-readable medium drive 206, and an input/output device interface 208, all of which may communicate with one another by way of a communication bus. The ARQ streaming service 110 may be physical hardware components or implemented in a virtualized environment. For the purpose of convenience for illustrating the FIG. 2, FIG. 2 is described by referencing the FIGS. 1A-1C.

The network interface 204 may provide connectivity to one or more networks or computing systems, such as the network 150 or network 160 of FIG. 1A. The processing unit 202 may thus receive information and instructions from other computing systems or services via a network. The processing unit 202 may also communicate to and from memory 210 and further provide output information for an optional display via the input/output device interface 208. In some embodiments, the ARQ streaming service 110 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the ARQ streaming service 110. The memory 210 may further include computer program instructions and other information for implementing aspects of the present disclosure. For example, in one embodiment, the memory 210 includes interface software 212 for receiving and processing one or more encoded content segments for the ARQ streaming service 110.

Additionally, the memory 210 may include streaming server management component 216. In some embodiments, the ARQ streaming service 110 includes more than one streaming server 112. In these embodiments, each streaming server 112 can form a path between the content streaming service 120 and the client computing device 102. For example, if the ARQ streaming service 110 includes two streaming servers, 112A, 112B, two communication paths can be formed, such that a path via the content streaming service 120, a first streaming server 112A, a load balancer 118, and the client computing device 102; and another path via the content streaming service 120, a second streaming server 112B, a load balancer 118, and the client computing device 102. In some embodiments, the streaming server management component 216 can manage the streaming servers implemented in the ARQ streaming service 110. For example, the streaming server management component 216 may manage the size of the data store 116 included in each streaming server 112. In some embodiments, the size of the data store 116 is related to the amount of data that the data store 116 can temporarily store while the content streaming service 120 is transmitting the encoded content segments. For example, the streaming server management component 216 may designate a certain amount of a number of encoded content segments to be temporary stored in a storage of the data store 116, where the storage is designated as a buffer. In this example, when the streaming server 112 receives the encoded content segments from the content streaming service 120, the streaming server management component 216 temporarily store the received encoded content segments in time-based sequence and updates the stored segments when the streaming server management component 216 receives a new segment. In some embodiments, the streaming server management component 216 may synchronize the number of encoded content segments that can be temporarily stored in each data store 116 of the streaming servers 112. In some embodiments, the streaming server management component 216 may modify the number of encoded content segments that can be temporarily stored in each data store 116 based on the health of the streaming servers 112A, 112B. For example, if one of the streaming servers 112 indicates its utilization ratio of the network resource above a threshold, the streaming server management component 216 may reduce the amount of the encoded content segments that can be temporarily stored in each data store 116 of the streaming servers 112. This amount of the encoded content segments that can be stored in a buffer of each data store 116 can generally refer to as buffer contents. In some embodiments, the data stores 116 in each streaming server 112 store the same number of buffer contents. The number of temporarily stored encoded content segments (e.g., buffer contents) can be determined based on streaming server performance, content type, network environment, etc.

Additionally, the memory 210 may include a response message management component 218. In some embodiments, the client computing device 102 may transmit a response message to the ARQ streaming service 110 while receiving the encoded content segments. In some embodiments, the response message can be a negative acknowledgment message (NACK). The NACK can indicate that client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the response message management component 218 may identify the lost encoded content segments based on the NACK. As described above, the lost encoded content segments can be identified according to a share streaming content identification. In some embodiments, the NACK may indicate the lost encoded content segments based on the time stamp. For example, the lost encoded content segments can be represented as the segments corresponding to a specific time duration, such as time duration between 33:05-33-08 (minutes:second). In this example, the response message management component 218 may identify the lost encoded content segments. In some embodiments, the response message management component 218, upon identifying the NACK message received from the client computing device 102, may access to the data store 116 to identify the encoded content segments corresponding to the NACK message. For example, when the streaming server 112A is transmitting the encoded content segments to the client computing device 102 and the failure occurs in the streaming server 112A, the computing device 102 may generate the NACK by identifying the lost encoded content segments transmitted while the failure occurs in the streaming server 112A. In this example, the load balancer automatically switches the connection to the streaming server 112B by enabling the streaming channel 172B (and disabling the streaming channel 172A). Then, the response message management component 218 may identify the lost encoded content segments based on time stamp associated with the lost encoded segments. For example, the NACK may provide specific time information that the client computing device 102 did not receive the encoded content segments. In this example, the response message management component 218 may access to the data store 116B and retransmit the encoded content segments corresponding to the specific time information.

In some embodiments, ARQ streaming service 110 may include a cluster of streaming servers configured to receive the NACK message from the client computing device 102 and retransmit the lost encoded content segments. In these embodiments, the response message management component 218 can be implemented to manage the cluster of streaming servers configured to receive the NACK message and retransmit the lost encoded content segments.

In some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 is receiving the encoded content segments from the streaming server 112A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B.

Additionally, the memory 210 may include a streaming server monitoring component 218. In some embodiments, the streaming server monitoring component 218 monitors the health status of the streaming servers 112 included in the ARQ streamlining service 110. In these embodiments, the monitoring health status of the streaming server may include but is not limited to monitoring CPU usage, memory usage, disk space, network traffic, streaming server uptime, etc. In some embodiments, the streaming server monitoring component 218 may monitor the health status of the streaming servers by associating with historical maintenance data of the streaming server. For example, if a first streaming server 112A has historical maintenance data, such as the first streaming server 112A failed after operating an average time of 100 hours, the streaming server monitoring component 218 may monitor the uptime of the streaming server 112A based on the 100 hours. For example, when the operating time of the streaming server 112A indicates about 90 hours, the streaming server monitoring component 218 may predict that the streaming server 112A may have a failure after operating for about 10 hours.

In some embodiments, the streaming server monitoring component 218 may recommend one or more streaming servers to be utilized to retransmit the lost encoded content segments. For example, if a failure is occurred in the first streaming server 112A while transmitting the encoded content segments to the clint computing device 102, the streaming server monitoring component 218 may automatically recommend another streaming server that can perform the retransmitting the lost encoded content segments while occurring the failure to the first streaming server 112A. In some embodiments, the recommendation is based on the monitoring results of each streaming server 112.

Additionally, the memory 210 may include a streaming configuration component 218. In some embodiments, the ARQ streaming service 110 includes a load balancer 118. In some embodiments, the streaming configuration component 218 may utilize the load balancer 118 to seamlessly configure the connection between the client computing device 102 and one of the streaming servers 112. In some embodiments, the load balancer 118 can provide functionality related to seamless connections to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and one the streaming servers 112A, 112B by enabling or disabling streaming channels 172A, 172B. For example, the load balancer 118 may enable the streaming channel 172A and disable the streaming channel 172B. In this example, the client computing device 102 can receive the encoded content segments from the streaming server 112A. However, if a failure occurs in the streaming server 112A, the load balancer 118 may automatically enable the streaming channel 172B and disable the streaming channel 172A.

In some embodiments, each streaming server 112A and 112B can be provided as a virtual computing environment. For example, each streaming server 112A and 112B can be accessed via designated IP addresses, and the load balancer 118 can configure the streaming channels 172A, 172B by utilizing the designated IP addresses. For example, the load balancer 118 can configure the streaming channel 172A by accessing to the IP addresses associated with the streaming server 112A.

Turning now to FIGS. 3A-3D, illustrative interactions of the components of the content delivery environment 100 will be described. For purposes of the illustration, it can be assumed that a content streaming service 120 has been configured in a manner to implement a plurality of streaming service 129 for the transmission of the encoded content segments to the ARQ streaming service 110, that client computing device 102 can download the encoded content segments. The present disclosure is not intended to be limited to any particular type of service or the number of individual components that may be accessed or generate processing results as part of an execution of an application on behalf of clients. Furthermore, the present disclosure is not intended to limit the number of streaming servers configured to transmit the encoded content segments to the client computing device 102.

Figure 3A:
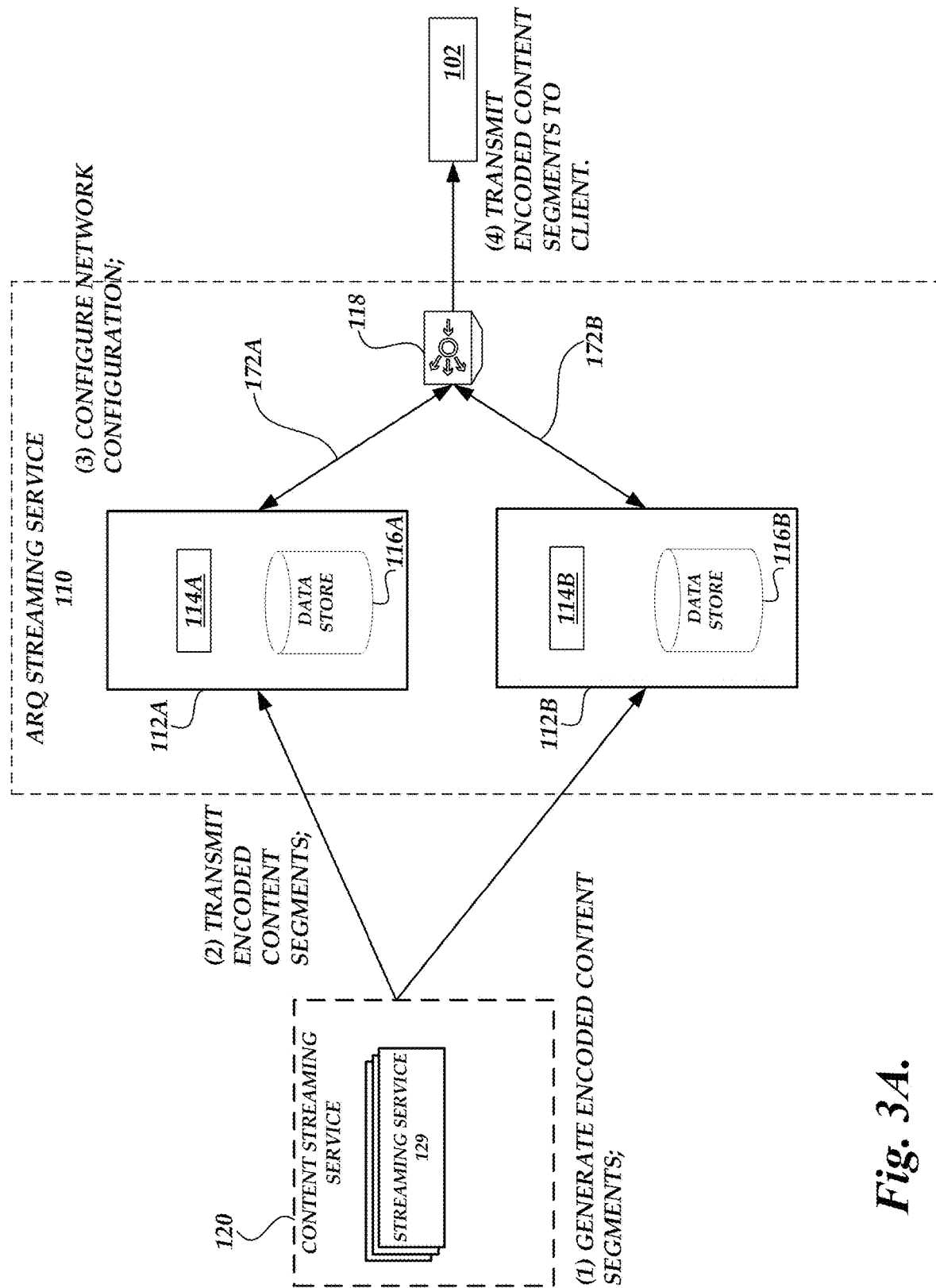
FIG. 3A depicts an illustrative interaction of providing the encoded content segments to the client computing device according to one or more embodiments.

With reference to FIG. 3A, an illustrative interaction of providing the encoded content segments to the client computing device 102, will be described. Accordingly, the interaction is illustrative. At (1), the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At (2), the content streaming service 120 may transmit the encoded content segments to the streaming servers 112 included in the ARQ streaming service 110. In some embodiments, the ARQ streaming service 110 includes more than one streaming server 112. In these embodiments, each streaming server 112 can form a path between the content streaming service 120 and the client computing device 102. For example, if the ARQ streaming service 110 includes two streaming servers, 112A, 112B, two communication paths can be formed, such that a path via the content streaming service 120, a first streaming server 112A, a load balancer 118, and the client computing device 102; and another path via the content streaming service 120, a second streaming server 112B, a load balancer 118, and the client computing device 102. In some embodiments, the streaming servers 112A, 112B may have the same storage size as the data store 116A, 116B included in each streaming server 112A, 112B. In some embodiments, the size of the data store 116A, 116B is related to the amount of data that the streaming servers 112A, 112B can temporarily store while the content streaming service 120 is transmitting the encoded content segments. For example, the ARQ streaming service 110 may designate a certain amount of a number of encoded content segments to be temporary stored in a buffer of the data store 116A, 116B. In this example, when streaming server 112 receives the encoded content segments from the content streaming service 120, the ARQ streaming service 110 temporarily stores the received encoded content segments in a time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B of the streaming servers 112A, 112B. For example, the ARQ streaming service 110 may determine the buffer content that can be temporarily stored in the data store 116A, 116B for buffering the streaming encoded content segments. In some embodiments, the ARQ streaming service 110 may modify the buffer contents based on the health of the streaming servers. For example, if the streaming server 112A indicates its utilization ratio of the network resource above a threshold, the ARQ streaming service 110 may reduce the amount of the encoded content segments that can be stored in each data store 116A, 116B of the streaming servers 112A, 112B. This amount of the temporarily stored encoded content segments can generally be referred to as buffer contents. In some embodiments, the streaming server 112A, 112B, by utilizing the ARQ information processing components 114A, 114B, can be communicatively coupled either directly (not shown in FIG. 3A) or indirectly via the load balancer 118. Thus, the buffer contents stored in each streaming server can be synchronized or dynamically varied based on content type, number of encoded contents, the health of each streaming server 112A, 112B, or network environment.

At (3), the ARQ streaming service 110 may configure the network connection between one of the streaming servers 112A, 112B, and the client computing device 102. In some embodiments, the ARQ streaming service 110 monitors the health status of the streaming servers 112A, 112B, and configure the network connection based on the monitoring results of the health status of the streaming servers 112A, 112B. In these embodiments, the monitoring health status of the streaming server may include but is not limited to monitoring CPU usage, memory usage, disk space, network traffic, streaming server uptime, etc. In some embodiments, the ARQ streaming service 110 may monitor the health status of the streaming servers by associating with historical maintenance data of the streaming server. For example, if a streaming server 112A has historical maintenance data, such as that the first streaming server 112A is failed after operating an average time of 100 hours, the ARQ streaming service 110 may monitor the uptime of the streaming server 112A based on the 100 hours. For example, when the operating time of the streaming server 112A indicates about 90 hours, the ARQ streaming service 110 may predict that the streaming server 112A may have a failure after operating for about 10 hours.

Further at (3), in some embodiments, the ARQ streaming service 110 includes a load balancer 118. In some embodiments, the ARQ streaming service 110 may utilize the load balancer 118 to configure the connection between the client computing device 102 and one of the streaming servers 112A, 112B. In some embodiments, the load balancer 118 can provide functionality related to a seamless connection to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and the streaming server 112A, 112B by enabling or disabling streaming channels 172A, 172B. For example, the load balancer 118 may enable streaming channel 172A and disable the streaming channel 172B. In this example, the client computing device 102 can receive the encoded content segments from the streaming server 112A.

In some embodiments, each streaming server 112A and 112B can be provided as a virtual computing environment. For example, each streaming server 112A and 112B can be accessed via designated IP addresses, and the load balancer 118 can configure the streaming channels 172A, 172B by utilizing the designated IP addresses. For example, the load balancer 118 can configure the streaming channel 172A by accessing to the IP addresses associated with the streaming server 112A.

At (4), the ARQ streaming service 110 may transmit the encoded content segments via the configured network configuration at (3).

Figure 3B:
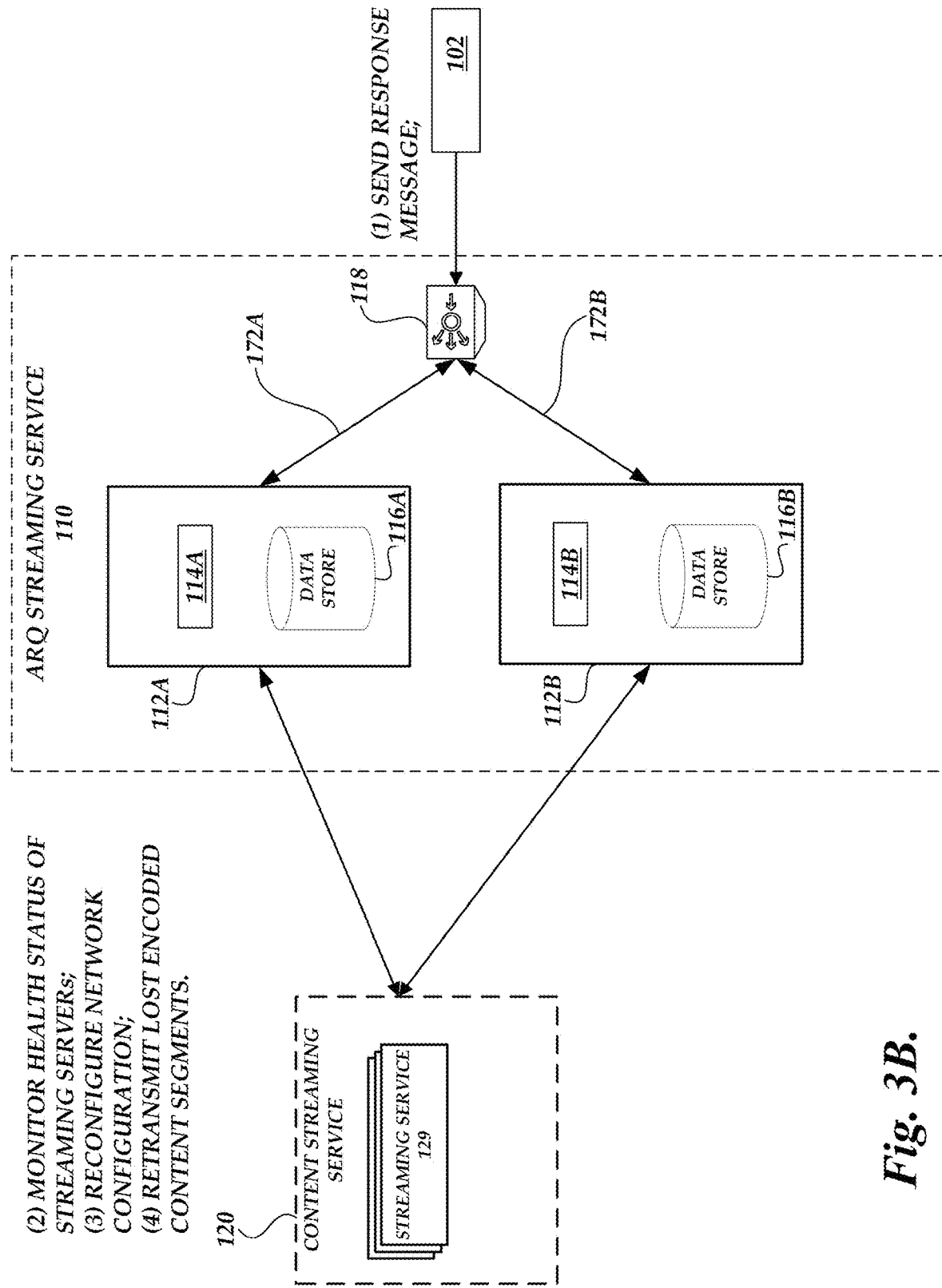
FIG. 3B depicts an illustrative interaction of reconfiguring network configuration according to one or more embodiments.

With reference to FIG. 3B, an illustrative interaction of reconfiguring network configuration, will be described. Accordingly, the interaction is illustrative.

At (1), the client computing device 102 may transmit a response message to the ARQ streaming service 110. In some embodiments, the response message can be an acknowledgment message or a negative acknowledgment message (NACK) based on message generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at (1), in some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 is receiving the encoded content segments from the streaming server 112A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B (the direct or indirect communication path between the ARQ information processing components 114A and 114B are not shown in FIG. 3B).

At (2), the ARQ streamlining service 110 may monitor the health status of the streaming servers 112A and 112B. In these embodiments, the monitoring health status of the streaming server may include but is not limited to monitoring CPU usage, memory usage, disk space, network traffic, streaming server uptime, etc. In some embodiments, the ARQ streamlining service 110 may monitor the health status of the streaming servers by associating with historical maintenance data of the streaming server. For example, if the streaming server 112A has historical maintenance data, such as that the first streaming server 112A failed after operating an average time of 100 hours, the ARQ streaming service 110 may monitor the uptime of the streaming server 112A based on the 100 hours. For example, when the operating time of the streaming server 112A indicates about 90 hours, the ARQ streamlining service 110 may predict that the streaming server 112A may have a failure after operating for about 10 hours.

In some embodiments, the ARQ streamlining service 110 may recommend one or more streaming servers to be utilized to retransmit the lost encoded content segments. For example, if a failure occurs in the first streaming server 112A while transmitting the encoded content segments to the clint computing device 102, the ARQ streaming service 110 may automatically recommend streaming server 112B that can perform the retransmitting the lost encoded content segments while occurring the failure to the first streaming server 112A. In some embodiments, the recommendation is based on the monitoring results of streaming servers 112A, 112B.

At (3), the ARQ streamlining service 110 may reconfigure the network configuration based on the monitoring result of the streaming server health at (2). For example, if the streaming server 112A is failed while transmitting the encoded content segments, the ARQ streamlining service 110 may disable streaming channel 172A and enable the streaming channel 172B. In some embodiments, the ARQ streamlining service 110 may identify the lost encoded content segments based on the time stamp associated with the lost encoded segments. For example, the NACK may provide specific time information that the client computing device 102 did not receive the encoded content segments. In this example, the ARQ information processing components 114B may access to the data store 116B and retransmit the encoded content segments corresponding to the specific time information. At (4), the ARQ streaming service 110 may retransmit the lost encoded content segments by using the reconfigured network configuration.

In alternative embodiments, the load balancer 118 can perform the steps (2) and (3) depicted in FIG. 3B. In these embodiments, the ARQ streaming service 110 may reconfigure the network connection without receiving a response message from the client computing device 102, thus, the step (1) depicted in FIG. 3B can be omitted. In some embodiments, at (2), the load balancer 118 may monitor the health status of streaming servers, 112A, 112B. For example, the load balancer 118 may monitor the health status of streaming servers 112A, 112B, while the streaming server 112A currently configured to transmit the encoded content segments to the client computing device. At (3), the load balancer 118 in response to determining that the streaming server 112A has a degraded performance or any indicative performance metric of failure, the load balancer 118 may reconfigure the network configuration by disabling the streaming channel 172A and enabling the streaming channel 172B.

Figure 3C:
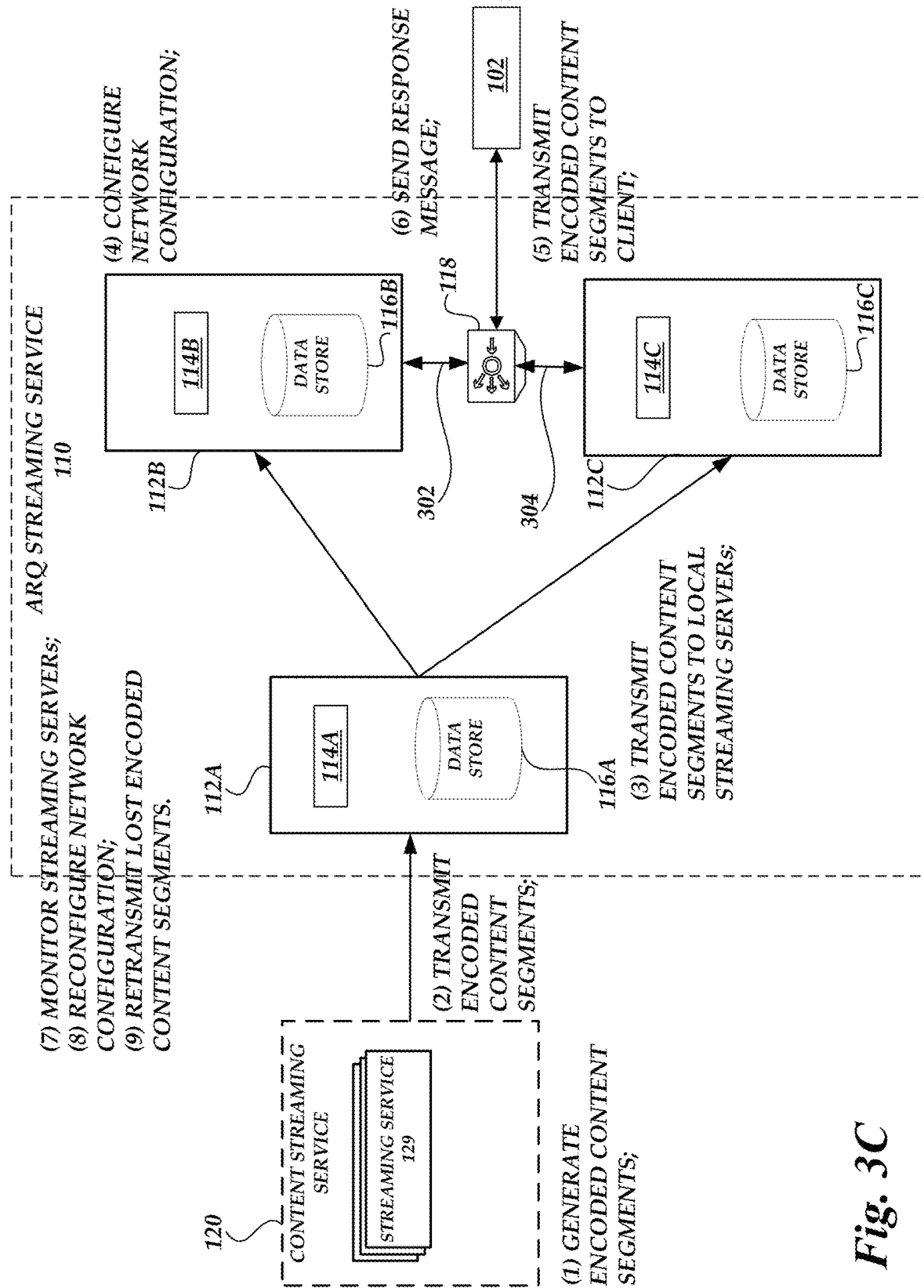
FIG. 3C depicts an illustrative interaction of transmitting the encoded content segments and seamlessly retransmitting lost encoded content segments according to one or more embodiments.

With reference to FIG. 3C, an illustrative interaction of transmitting the encoded content segments and seamlessly retransmitting lost encoded content segments, will be described. Accordingly, the interaction is illustrative.

At (1), the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At (2), the content streaming service 120 may transmit the encoded content segments to the streaming server 112A included in the ARQ streaming service 110. In some embodiments, streaming server 112A can be located in a specific region. In some embodiments, the specific region can be a region geographically closer to the content streaming service 120 or the original content provider 130.

At (3), the streaming server 112A may transmit the encoded content segments to the local streaming servers 112B, 112C. In some embodiments, each local streaming server 112B and 112C can form a path between the content streaming service 120 and the client computing device 102. For example, if the ARQ streaming service 110 includes two local streaming servers, 112B, 112C, two communication paths can be formed, such that a path via the content streaming service 120, a regional streaming server 112A, a first local streaming server 112B, a load balancer 118, and the client computing device 102; and another path via the content streaming service 120, a regional streaming server 112A, a second local streaming server 112C, a load balancer 118, and the client computing device 102. In some embodiments, the local streaming servers 112B, 112C may have the same storage size as the data store 116A, 116B with the storage size of the data store 116A of the regional streaming server 112A. In some embodiments, the size of the data store 116A, 116B, 116C is related to the amount of data that the streaming servers 112A, 112B, 112C can temporarily store while the content streaming service 120 is transmitting the encoded content segments. For example, the ARQ streaming service 110 may designate a certain amount of a number of encoded content segments to be temporarily stored in the buffer of each data store 116A, 116B, 116C. In this example, when the regional streaming server 112A and the local streaming server 112B or 112C receives the encoded content segments from the content streaming service 120, the ARQ streaming service 110 temporarily store the received encoded content segments in time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B, 116C of the streaming servers 112A, 112B, 112C. In some embodiments, the ARQ streaming service 110 may modify the number of encoded content segments that can be stored in each data store 116A, 116B, 116C based on the health of the streaming servers. For example, if the regional streaming server 112A indicates its utilization ratio of the network resource above a threshold, the ARQ streaming service 110 may reduce the amount of the encoded content segments that can be stored in each data store 116A, 116B, 116C of the streaming servers 112A, 112B, 112C. This amount of the encoded content segments can generally be referred to as buffer contents. In some embodiments, the buffer of each data store 116A, 116B, 116C stores the same amount of buffer contents. In some embodiments, the buffer contents in each data store 116A, 116B, 116C are synchronized. In some embodiments, the streaming server 112B, 112C, by utilizing the ARQ information processing components 114B, 114C, can be communicatively coupled either directly (not shown in FIG. 3C) or indirectly via the load balancer 118. Thus, the buffer contents stored in each streaming server 112B, 112C can be synchronized or dynamically synchronized with the buffer contents of the streaming server 112A.

At (4), the ARQ streaming service 110 may configure the network connection between one of the local streaming servers 112B, 112C, and the client computing device 102. In some embodiments, the ARQ streaming service 110 monitors the health status of the local streaming servers 112B, 112C, and configure the network connection based on the monitoring results of the health status of the local streaming servers 112B, 112C. In these embodiments, the monitoring health status of the streaming server may include but is not limited to monitoring CPU usage, memory usage, disk space, network traffic, streaming server uptime, etc. In some embodiments, the ARQ streaming service 110 may monitor the health status of the streaming servers by associating with historical maintenance data of the streaming server. For example, if a local streaming server 112B has historical maintenance data, such as that the local streaming server 112B failed after operating an average time of 100 hours, the ARQ streaming service 110 may monitor the uptime of the local streaming server 112B based on the 100 hours. For example, when the operating time of the local streaming server 112B indicates about 90 hours, the ARQ streaming service 110 may predict that the local streaming server 112B may have a failure after operating for about 10 hours.

Further at (4), in some embodiments, the ARQ streaming service 110 includes a load balancer 118. In some embodiments, the ARQ streaming service 110 may utilize the load balancer 118 to configure the connection between the client computing device 102 and one of the local streaming servers 112B, 112C. In some embodiments, the load balancer 118 can provide functionality related to a seamless connection to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and one of the local streaming servers 112B, 112C.

At (5), the ARQ streaming service 110 may transmit the encoded content segments via the configured network configuration at (4).

At (6), the client computing device 102 may transmit a response message to the ARQ streaming service 110. In some embodiments, the response message can be an acknowledgment message or a negative acknowledgment message (NACK) based on message generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at (6), in some embodiments, where the response message is an acknowledgment message, the client computing device may transmit a confirmation of the received encoded content segments. In these embodiments, the ARQ information processing components 114B, 114C may analyze the acknowledgment message and determine the lost encoded content segments. For example, when the client computing device 102 is receiving the encoded content segments from the local streaming server 112B, the ARQ information processing components 114B may compare the transmitted encoded content segments with the acknowledgment message received from the client computing device 102. In this example, when the ARQ information processing components 114B identifies one or more encoded content segments that transmitted but did not receive the acknowledgment message, the ARQ information processing components 114B may designate these segments as the lost encoded content segments. In some embodiments, the ARQ information processing components 114B may provide the lost encoded content segments to the ARQ information processing components 114C by directly or indirectly communicating with the ARQ information processing components 114C (the direct or indirect communication path between the ARQ information processing components 114B and 114C are not shown in FIG. 3C).

At (7), the ARQ streamlining service 110 may monitor the health status of the local streaming servers 112B and 112C. In these embodiments, the monitoring health status of the streaming server may include but is not limited to monitoring CPU usage, memory usage, disk space, network traffic, streaming server uptime, etc. In some embodiments, the ARQ streamlining service 110 may monitor the health status of the streaming servers by associating with historical maintenance data of the streaming server. For example, if the local streaming server 112B has historical maintenance data, such as the local streaming server 112B is failed after operating an average time of 100 hours, the ARQ streaming service 110 may monitor the uptime of the local streaming server 112B based on the 100 hours. For example, when the operating time of the local streaming server 112B indicates about 90 hours, the ARQ streamlining service 110 may predict that the local streaming server 112B may have a failure after operating for about 10 hours.

In some embodiments, the ARQ streamlining service 110 may recommend one or more streaming servers to be utilized to retransmit the lost encoded content segments. For example, if a failure occurs in the local streaming server 112B while transmitting the encoded content segments to the client computing device 102, the ARQ streaming service 110 may automatically recommend local streaming server 112C that can perform the retransmitting of the lost encoded content segments while occurring the failure to the local streaming server 112B. In some embodiments, the recommendation is based on the monitoring results of streaming servers 112B, 112C.

At (8), the ARQ streamlining service 110 may reconfigure the network configuration based on the monitoring result of the streaming server health at (6). In some embodiments, the ARQ streamlining service 110 may identify the lost encoded content segments based on the time stamp associated with the lost encoded segments. For example, the NACK may provide specific time information that the client computing device 102 did not receive the encoded content segments. In this example, the ARQ information processing components 114C may access to the data store 116C and retransmit the encoded content segments corresponding to the specific time information.

At (9), the ARQ streamlining service 110 may retransmit the lost encoded content segments utilizing the reconfigured network configuration at (8).

In alternative embodiments, the load balancer 118 can perform the steps (7) and (8) depicted in FIG. 3C. In these embodiments, the ARQ streaming service 110 may reconfigure the network connection without receiving a response message from the client computing device 102, thus, the step (6) depicted in FIG. 3B can be omitted. In some embodiments, at (7), the load balancer 118 may monitor the health status of streaming servers, 112B, 112C. For example, the load balancer 118 may monitor the health status of streaming servers 112B, 112C, while the streaming server 112B is currently configured to transmit the encoded content segments to the client computing device 102. At (8), the load balancer 118, in response to determining that the streaming server 112B has a degraded performance or any indicative performance metric of failure, the load balancer 118 may reconfigure the network configuration by disabling the streaming channel 302 and enabling the streaming channel 304.

Figure 3D:
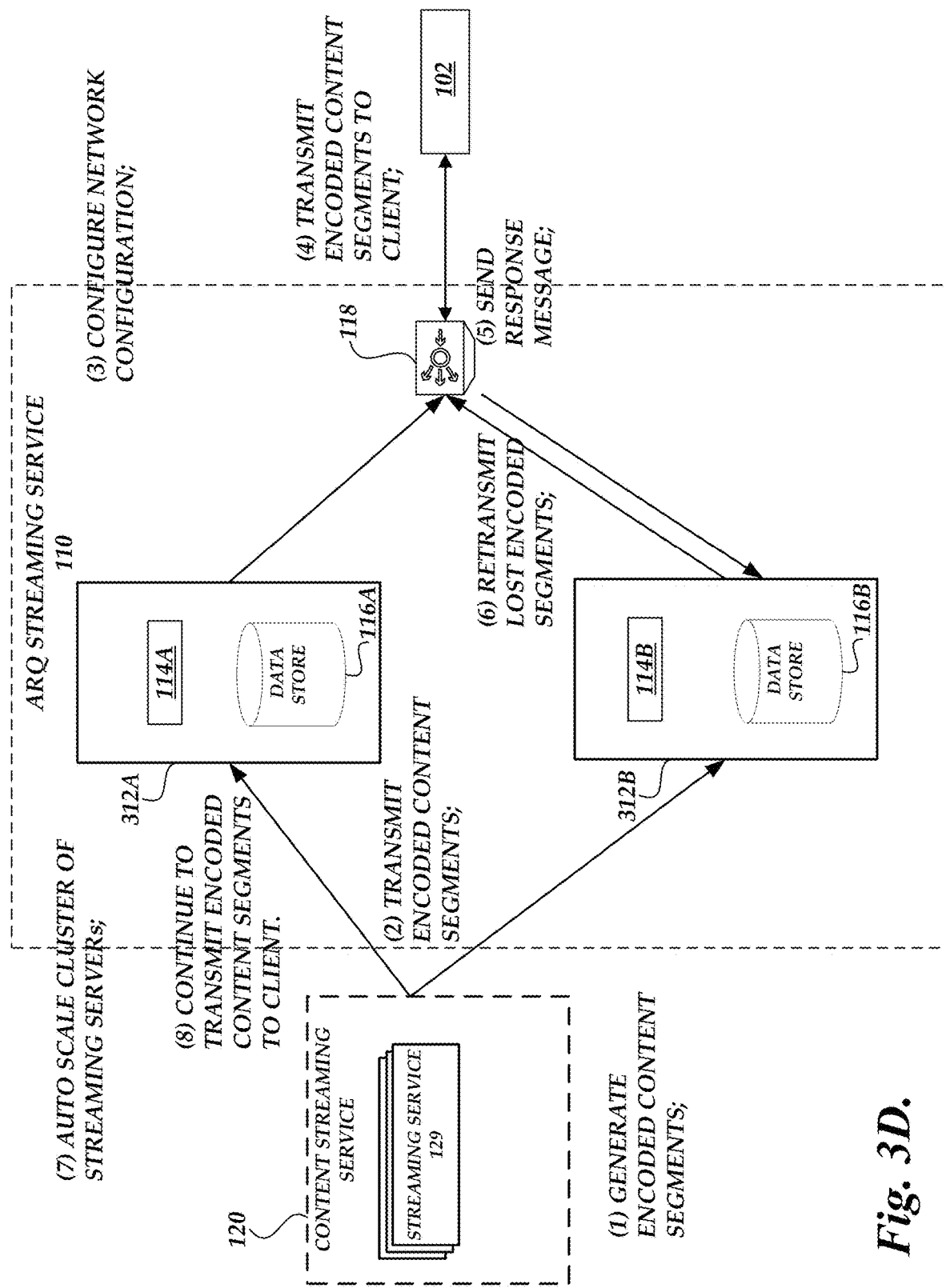
FIG. 3D depicts an illustrative interaction of the content delivery environment by implementing clusters of streaming servers according to one or more embodiments.

With reference to FIG. 3D, an illustrative interaction of the content delivery environment according to one or more embodiments, as disclosed herein, will be described. Accordingly, the interaction is illustrative.

At (1), the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At (2), the content streaming service 120 may transmit the encoded content segments to the clusters of streaming servers 312A, 312B included in the ARQ streaming service 110. In some embodiments, the ARQ streaming service 110 includes more than one cluster of streaming servers. In these embodiments, the streaming servers are cauterized based on the role of the cluster of streaming servers. For example, the cluster of streaming servers 312A can be configured to transmit the encoded content segments to the client computing device 102. The cluster of streaming servers 312B can be configured to receive a NACK message from the client computing device 102 and retransmit the lost encoded content segments. In some embodiments, the cluster of streaming servers 312A, 312B can form a path between the content streaming service 120 and the client computing device 102. For example, if the ARQ streaming service 110 includes 2 clusters of streaming servers, 312A, 312B, two communication paths can be formed, such that a path via the content streaming service 120, a first cluster of streaming servers 312A, a load balancer 118, and the client computing device 102; and another path via the content streaming service 120, a second cluster of streaming servers 312B, a load balancer 118, and the client computing device 102. In some embodiments, the clusters of streaming servers 312A, 312B may have the same storage size of the data store 116A, 116B included in each cluster of streaming servers 312A, 312B. In some embodiments, the size of the data store 116A, 116B is related to the amount of data that each cluster of streaming servers 312A, 312B can temporarily store while the content streaming service 120 is transmitting the encoded content segments. For example, the ARQ streaming service 110 may designate a certain number of encoded content segments to be temporarily stored in the buffer of the data store 116A, 116B. In this example, when the cluster of streaming servers 312A, 312B receives the encoded content segments from the content streaming service 120, the ARQ streaming service 110 temporarily stores the received encoded content segments in time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B of the clusters of streaming servers 312A, 312B. In some embodiments, the ARQ streaming service 110 may modify the number of encoded content segments that can be stored in each data store 116A, 116B based on the health of the streaming servers. For example, if the cluster of streaming servers 312A indicates its utilization ratio of the network resource above a threshold, the ARQ streaming service 110 may reduce the amount of the encoded content segments that can be stored in each data store 116A, 116B of the clusters of streaming servers 312A, 312B. This amount of the encoded content segments can generally be referred to as buffer content (or buffer contents). In some embodiments, the buffer of each data store 116A, 116B stores the same amount of buffer contents. In some embodiments, the buffer contents in each data store 116A, 116B are synchronized.

At (3), the ARQ streaming service 110 may configure the network connection between the clusters of streaming servers 312A and the client computing device 102. In some embodiments, the cluster of streaming servers 312A is configured to transmit the encoded content segments to the client computing device 102. At (4), the cluster of streaming servers 312A may transmit the encoded content segments to the client computing device 102.

At (5), the client computing device 102 may transmit a response message to the ARQ streaming service 110. In some embodiments, the response message can be an acknowledgment message or a negative acknowledgment message (NACK) based on message-generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as a lost encoded content segment. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at (5), in some embodiments, the NACK can be transmitted to the cluster of streaming servers 312B. In these embodiments, the cluster of streaming servers 312B can be configured to receive the NACK and retransmit the lost encoded content segments.

Further at (5), in some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 is receiving the encoded content segments from the cluster of streaming servers 312A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B (the direct or indirect communication path between the ARQ information processing components 114A and 114B are not shown in FIG. 3D). In some embodiments, the load balancer 118 can configure the cluster of streaming servers 312B to transmit the encoded content segments to the client computing device 102 after the ARQ streaming service identified the lost encoded content segments. For example, the ARQ streaming service may identify the lost encoded content segments by receiving the response message from the client computing device and configuring the cluster of streaming servers 312B to retransmit the lost encoded content segments at (6). In another embodiment, the ARQ streaming service 110, after identifying the failure in the cluster of streaming servers 312A (before receiving the response message from the client computing device 102) may configure the cluster of streaming servers 312B to retransmit the lost encoded content segments at (6).

At (6), the cluster of streaming servers 312B may retransmit the lost encoded content segments to the client computing device 102. Since the data stores 116A, 116B store the same amount of recently transmitted encoded content segments, the cluster of streaming servers 312B can identify the lost encoded content segments and retransmit the segments to the client computing device 102. For example, if the NACK identifies the lost encoded content segments corresponding to the time period of 33:05-33-08 (minutes:second), the data store 116A and 116B include the same encoded content segments corresponding to the time period of 33:05-33-08 (minutes:second).

At (7), the ARQ streaming service 110 may auto scale the cluster of streaming servers 312A. The auto scale may represent a process to redistribute the network resources across the cluster of streaming servers 312A. In some embodiments, the ARQ streaming service 110 may perform steps (6) and (7) parallelly.

At (8), the cluster of streaming servers 312A may continue to transmit the remaining encoded content segments to the client computing device 102.

In alternative embodiments, the load balancer 118 may monitor the health status of cluster of streaming servers 312A. In these embodiments, if the monitoring results of the cluster of streaming servers 312A indicate any performance degradation or failure, the load balancer 118 may reconfigure the network configuration with the cluster of streaming servers 312B by disabling the network connection with the cluster of streaming servers 312A. In some embodiments, the load balancer 118 continues to monitor the health status of the cluster of streaming servers 312B, and in response to determining that the health status of the cluster of streaming servers 312A is in good status, or above a threshold, the load balancer 118 may reconfigure the network connection with the cluster of streaming servers 312A by disabling the network connection with the cluster of streaming servers 312A.

Figure 4:
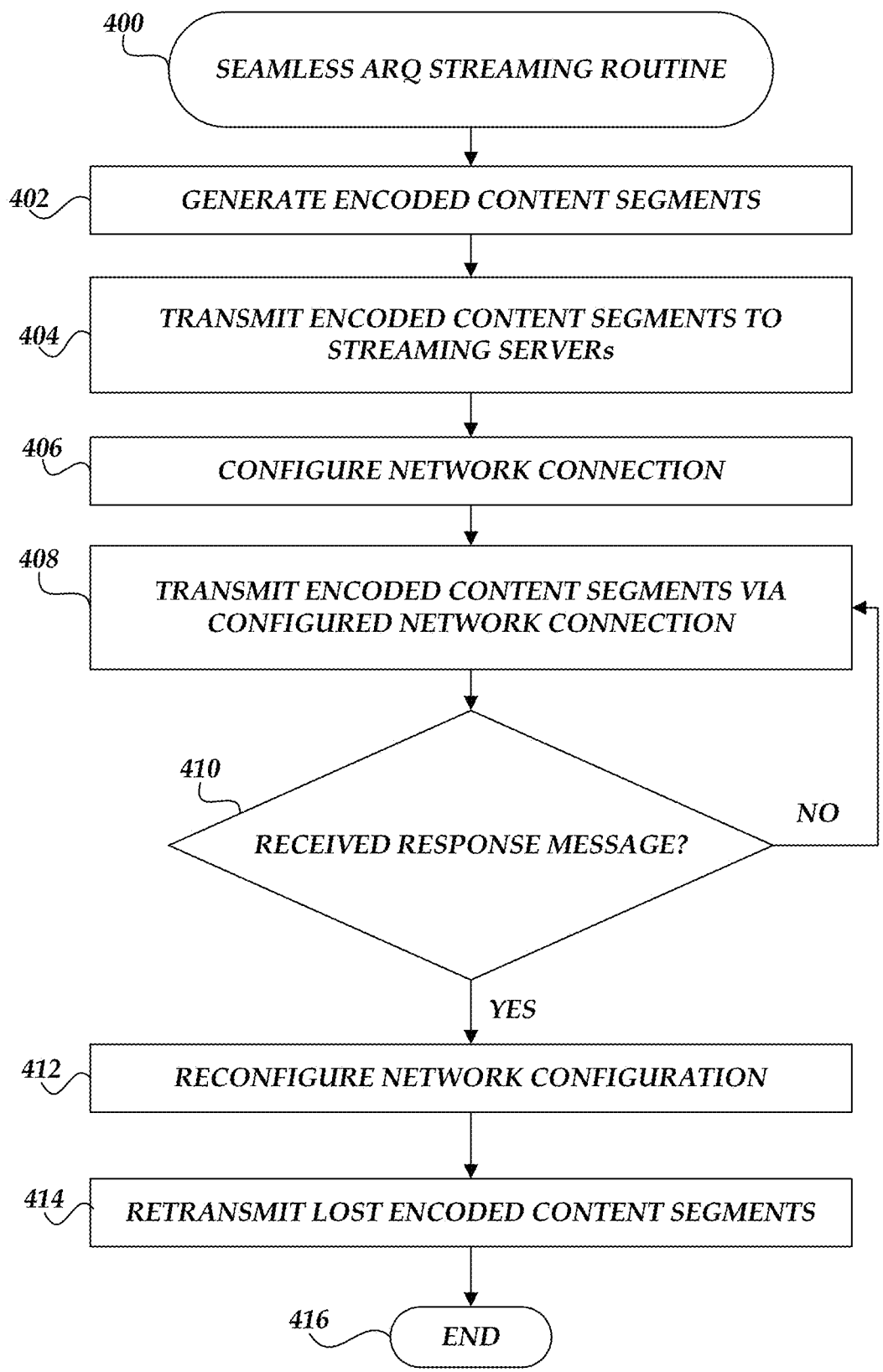
FIG. 4 is a flow diagram illustrative of a seamless ARQ streaming implemented by the ARQ streaming service.

Turning now to FIG. 4, a routine 400 for the seamless ARQ streaming routine will be described. Routine 400 is illustratively implemented by the ARQ streaming service 110.

At block 402, the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At block 404, the content streaming service 120 may transmit the encoded content segments to the streaming servers 112 included in the ARQ streaming service 110. In some embodiments, the ARQ streaming service 110 includes more than one streaming server 112. In these embodiments, each streaming server 112 can form a path between the content streaming service 120 and the client computing device 102. For example, if the ARQ streaming service 110 includes two streaming servers, 112A, 112B, two communication paths can be formed, such that a path via the content streaming service 120, a first streaming server 112A, a load balancer 118, and the client computing device 102; and another path via the content streaming service 120, a second streaming server 112B, a load balancer 118, and the client computing device 102. In some embodiments, the streaming servers 112A, 112B may have the same storage size as the data store 116A, 116B included in each streaming server 112A, 112B. In some embodiments, the size of the data store 116A, 116B is related to the amount of data that the streaming servers 112A, 112B can temporarily store while the content streaming service 120 is transmitting the encoded content segments. For example, the ARQ streaming service 110 may designate a certain amount of a number of encoded content segments to be temporary stored in a buffer of the data store 116A, 116B. In this example, when streaming server 112 receives the encoded content segments from the content streaming service 120, the ARQ streaming service 110 temporarily stores the received encoded content segments in a time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B of the streaming servers 112A, 112B. In some embodiments, the ARQ streaming service 110 may modify the number of encoded content segments that can be stored in each data store 116A, 116B based on the health of the streaming servers. For example, if the streaming server 112A indicates its utilization ratio of the network resource above a threshold, the ARQ streaming service 110 may reduce the amount of the encoded content segments that can be stored in each data store 116A, 116B of the streaming servers 112A, 112B. This amount of the encoded content segments can generally be referred to as buffer contents. In some embodiments, the buffer of each data store 116A, 116B stores the same amount of buffer contents. In some embodiments, the buffer contents in each data store 116A, 116B are synchronized.

At block 406, the ARQ streaming service 110 may configure the network connection between one of the streaming servers 112A, 112B, and the client computing device 102. In some embodiments, the ARQ streaming service 110 monitors the health status of the streaming servers 112A, 112B, and configure the network connection based on the monitoring results of the health status of the streaming servers 112A, 112B. In these embodiments, the monitoring health status of the streaming server may include but is not limited to monitoring CPU usage, memory usage, disk space, network traffic, streaming server uptime, etc. In some embodiments, the ARQ streaming service 110 may monitor the health status of the streaming servers by associating with historical maintenance data of the streaming server. For example, if a streaming server 112A has historical maintenance data, such as that the first streaming server 112A is failed after operating an average time of 100 hours, the ARQ streaming service 110 may monitor the uptime of the streaming server 112A based on the 100 hours. For example, when the operating time of the streaming server 112A indicates about 90 hours, the ARQ streaming service 110 may predict that the streaming server 112A may have a failure after operating for about 10 hours.

Further at block 406, in some embodiments, the ARQ streaming service 110 includes a load balancer 118. In some embodiments, the ARQ streaming service 110 may utilize the load balancer 118 to configure the connection between the client computing device 102 and one of the streaming servers 112A, 112B. In some embodiments, the load balancer 118 can provide functionality related to a seamless connection to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and the streaming server 112A, 112B by enabling or disabling streaming channels 172A, 172B. For example, the load balancer 118 may enable streaming channel 172A and disable the streaming channel 172B. In this example, the client computing device 102 can receive the encoded content segments from the streaming server 112A.

In some embodiments, each streaming server 112A and 112B can be provided as a virtual computing environment. For example, each streaming server 112A and 112B can be accessed via designated IP addresses, and the load balancer 118 can configure the streaming channels 172A, 172B by utilizing the designated IP addresses. For example, the load balancer 118 can configure the streaming channel 172A by accessing to the IP addresses associated with the streaming server 112A.

At block 408, the ARQ streaming service 110 may transmit the encoded content segments via the configured network configuration at block 406.

At decision block 410, the ARQ streaming service 110 may determine whether the ARQ streaming service 110 received a response message from the client computing device 102. In some embodiments, the client computing device 102 may transmit a response message to the ARQ streaming service 110. In some embodiments, the response message can be an acknowledgment message or a negative acknowledgment message (NACK) based on message generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at block 410, in some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 is receiving the encoded content segments from the streaming server 112A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B (the direct or indirect communication path between the ARQ information processing components 114A and 114B are not shown in FIG. 3B). If the ARQ streaming service 110 received the response message, the routine 400 proceed to block 412. If the ARQ streaming service 110 did not receive the response message, the routine 400 proceeded to block 408.

At block 412, the ARQ streamlining service 110 may reconfigure the network configuration based on the monitoring result of the streaming server's health. In some embodiments, the monitoring health status of the streaming server may include but is not limited to monitoring CPU usage, memory usage, disk space, network traffic, streaming server uptime, etc. In some embodiments, the ARQ streamlining service 110 may monitor the health status of the streaming servers by associating with historical maintenance data of the streaming server. For example, if the streaming server 112A has historical maintenance data, such as that the first streaming server 112A failed after operating an average time of 100 hours, the ARQ streaming service 110 may monitor the uptime of the streaming server 112A based on the 100 hours. For example, when the operating time of the streaming server 112A indicates about 90 hours, the ARQ streamlining service 110 may predict that the streaming server 112A may have a failure after operating for about 10 hours. In some embodiments, the ARQ streamlining service 110 may recommend one or more streaming servers to be utilized to retransmit the lost encoded content segments. For example, if a failure occurs in the first streaming server 112A while transmitting the encoded content segments to the clint computing device 102, the ARQ streaming service 110 may automatically recommend streaming server 112B that can perform the retransmitting the lost encoded content segments while occurring the failure to the first streaming server 112A. In some embodiments, the recommendation is based on the monitoring results of streaming servers 112A, 112B. For example, if the streaming server 112A is failed while transmitting the encoded content segments, the ARQ streamlining service 110 may disable streaming channel 172A and enable the streaming channel 172B. In some embodiments, the ARQ streamlining service 110 may identify the lost encoded content segments based on the time stamp associated with the lost encoded segments. For example, the NACK may provide specific time information that the client computing device 102 did not receive the encoded content segments. In this example, the ARQ information processing components 114B may access to the data store 116B and retransmit the encoded content segments corresponding to the specific time information.

At block 414, the ARQ streaming service 110 may retransmit the lost encoded content segments by using the reconfigured network configuration. The routine 400 can be ended at block 416.

Figure 5:
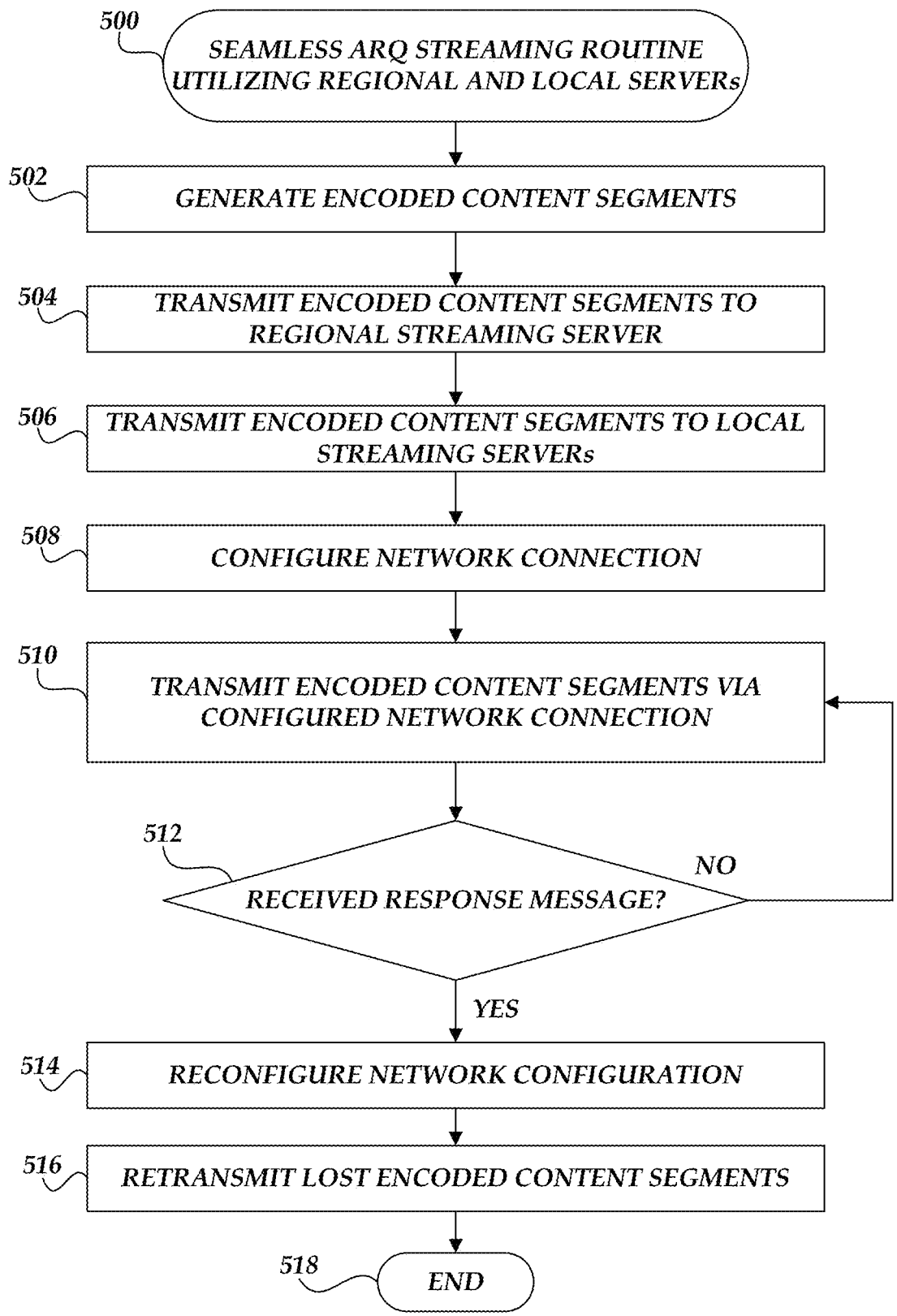
FIG. 5 is a flow diagram illustrative of a seamless ARQ streaming by utilizing regional and local streaming servers and implemented by the ARQ streaming service.

Turning now to FIG. 5, a routine 500 for the seamless ARQ streaming routine utilizing regional and local streaming servers will be described. Routine 500 is illustratively implemented by the ARQ streaming service 110.

At block 502, the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At block 504, the content streaming service 120 may transmit the encoded content segments to the streaming server 112A included in the ARQ streaming service 110. In some embodiments, streaming server 112A can be located in a specific region. In some embodiments, the specific region can be a region geographically closer to the content streaming service 120 or the original content provider 130.

At block 506, the streaming server 112A may transmit the encoded content segments to the local streaming servers 112B, 112C. In some embodiments, each local streaming server 112B and 112C can form a path between the content streaming service 120 and the client computing device 102. For example, if the ARQ streaming service 110 includes two local streaming servers, 112B, 112C, two communication paths can be formed, such that a path via the content streaming service 120, a regional streaming server 112A, a first local streaming server 112B, a load balancer 118, and the client computing device 102; and another path via the content streaming service 120, a regional streaming server 112A, a second local streaming server 112C, a load balancer 118, and the client computing device 102. In some embodiments, the local streaming servers 112B, 112C may have the same storage size as the data store 116A, 116B with the storage size of the data store 116A of the regional streaming server 112A. In some embodiments, the size of the data store 116A, 116B, 116C is related to the amount of data that the streaming servers 112A, 112B, 112C can temporarily store while the content streaming service 120 is transmitting the encoded content segments. For example, the ARQ streaming service 110 may designate a certain amount of a number of encoded content segments to be temporary stored in a buffer of the data store 116A, 116B, 116C. In this example, when the regional streaming server 112A and the local streaming server 112B or 112C receives the encoded content segments from the content streaming service 120, the ARQ streaming service 110 temporary store the received encoded content segments in time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B, 116C of the streaming servers 112A, 112B, 112C. In some embodiments, the ARQ streaming service 110 may modify the number of encoded content segments that can be stored in each data store 116A, 116B, 116C based on the health of the streaming servers. For example, if the regional streaming server 112A indicates its utilization ratio of the network resource above a threshold, the ARQ streaming service 110 may reduce the amount of the encoded content segments that can be stored in each data store 116A, 116B, 116C of the streaming servers 112A, 112B, 112C. This amount of the encoded content segments can generally be referred to as buffer contents. In some embodiments, the buffer of each data store 116A, 116B, 116C stores the same amount of buffer contents. In some embodiments, the buffer contents in each data store 116A, 116B, 116C are synchronized.

At block 508, the ARQ streaming service 110 may configure the network connection between one of the local streaming servers 112B, 112C, and the client computing device 102. In some embodiments, the ARQ streaming service 110 monitors the health status of the local streaming servers 112B, 112C, and configure the network connection based on the monitoring results of the health status of the local streaming servers 112B, 112C. In these embodiments, the monitoring health status of the streaming server may include but is not limited to monitoring CPU usage, memory usage, disk space, network traffic, streaming server uptime, etc. In some embodiments, the ARQ streaming service 110 may monitor the health status of the streaming servers by associating with historical maintenance data of the streaming server. For example, if a local streaming server 112B has historical maintenance data, such as that the local streaming server 112B failed after operating an average time of 100 hours, the ARQ streaming service 110 may monitor the uptime of the local streaming server 112B based on the 100 hours. For example, when the operating time of the local streaming server 112B indicates about 90 hours, the ARQ streaming service 110 may predict that the local streaming server 112B may have a failure after operating for about 10 hours.

Further at block 508, in some embodiments, the ARQ streaming service 110 includes a load balancer 118. In some embodiments, the ARQ streaming service 110 may utilize the load balancer 118 to configure the connection between the client computing device 102 and one of the local streaming servers 112B, 112C. In some embodiments, the load balancer 118 can provide functionality related to a seamless connection to the client computing devices 102 and efficiently utilize the network resources by optimizing network configuration. Illustratively, the load balancer 118 can be configured to direct the encoded content segments to the client computing device 102. For example, the load balancer 118 may configure the network connection between the client computing device 102 and one of the local streaming servers 112B, 112C.

At block 510, the ARQ streaming service 110 may transmit the encoded content segments via the configured network configuration at block 508.

At decision block 512, the ARQ streaming service 110 may determine whether the ARQ streaming service 110 received a response message from the client computing device 102. In some embodiments, the client computing device 102 may transmit a response message to the ARQ streaming service 110. In some embodiments, the response message can be an acknowledgment message or a negative acknowledgment message (NACK) based on message generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as lost encoded content segments. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at block 512, in some embodiments, where the response message is an acknowledgment message, the client computing device may transmit a confirmation of the received encoded content segments. In these embodiments, the ARQ information processing components 114B, 114C may analyze the acknowledgment message and determine the lost encoded content segments. For example, when the client computing device 102 is receiving the encoded content segments from the local streaming server 112B, the ARQ information processing components 114B may compare the transmitted encoded content segments with the acknowledgment message received from the client computing device 102. In this example, when the ARQ information processing components 114B identifies one or more encoded content segments that transmitted but did not receive the acknowledgment message, the ARQ information processing components 114B may designate these segments as the lost encoded content segments. In some embodiments, the ARQ information processing components 114B may provide the lost encoded content segments to the ARQ information processing components 114C by directly or indirectly communicating with the ARQ information processing components 114C (the direct or indirect communication path between the ARQ information processing components 114B and 114C are not shown in FIG. 3C). If the ARQ streaming service 110 received the response message, the routine 500 proceed to block 514. If the ARQ streaming service 110 did not receive the response message, the routine 500 proceed to block 510.

At block 514, the ARQ streamlining service 110 may reconfigure the network configuration based on the monitoring result of the streaming server's health. In some embodiments, the ARQ streamlining service 110 may monitor the health status of the local streaming servers 112B and 112C. In these embodiments, the monitoring health status of the streaming server may include but is not limited to monitoring CPU usage, memory usage, disk space, network traffic, streaming server uptime, etc. In some embodiments, the ARQ streamlining service 110 may monitor the health status of the streaming servers by associating with historical maintenance data of the streaming server. For example, if the local streaming server 112B has historical maintenance data, such as the local streaming server 112B is failed after operating an average time of 100 hours, the ARQ streaming service 110 may monitor the uptime of the local streaming server 112B based on the 100 hours. For example, when the operating time of the local streaming server 112B indicates about 90 hours, the ARQ streamlining service 110 may predict that the local streaming server 112B may have a failure after operating for about 10 hours. In some embodiments, the ARQ streamlining service 110 may recommend one or more streaming servers to be utilized to retransmit the lost encoded content segments. For example, if a failure occurs in the local streaming server 112B while transmitting the encoded content segments to the client computing device 102, the ARQ streaming service 110 may automatically recommend local streaming server 112C that can perform the retransmitting of the lost encoded content segments while occurring the failure to the local streaming server 112B. In some embodiments, the recommendation is based on the monitoring results of streaming servers 112B, 112C.

In some embodiments, the ARQ streamlining service 110 may identify the lost encoded content segments based on the time stamp associated with the lost encoded segments. For example, the NACK may provide specific time information that the client computing device 102 did not receive the encoded content segments. In this example, the ARQ information processing components 114C may access to the data store 116C and retransmit the encoded content segments corresponding to the specific time information.

At block 516, the ARQ streamlining service 110 may retransmit the lost encoded content segments utilizing the reconfigured network configuration at block 514. The routine 500 can be ended at block 518.

Figure 6:
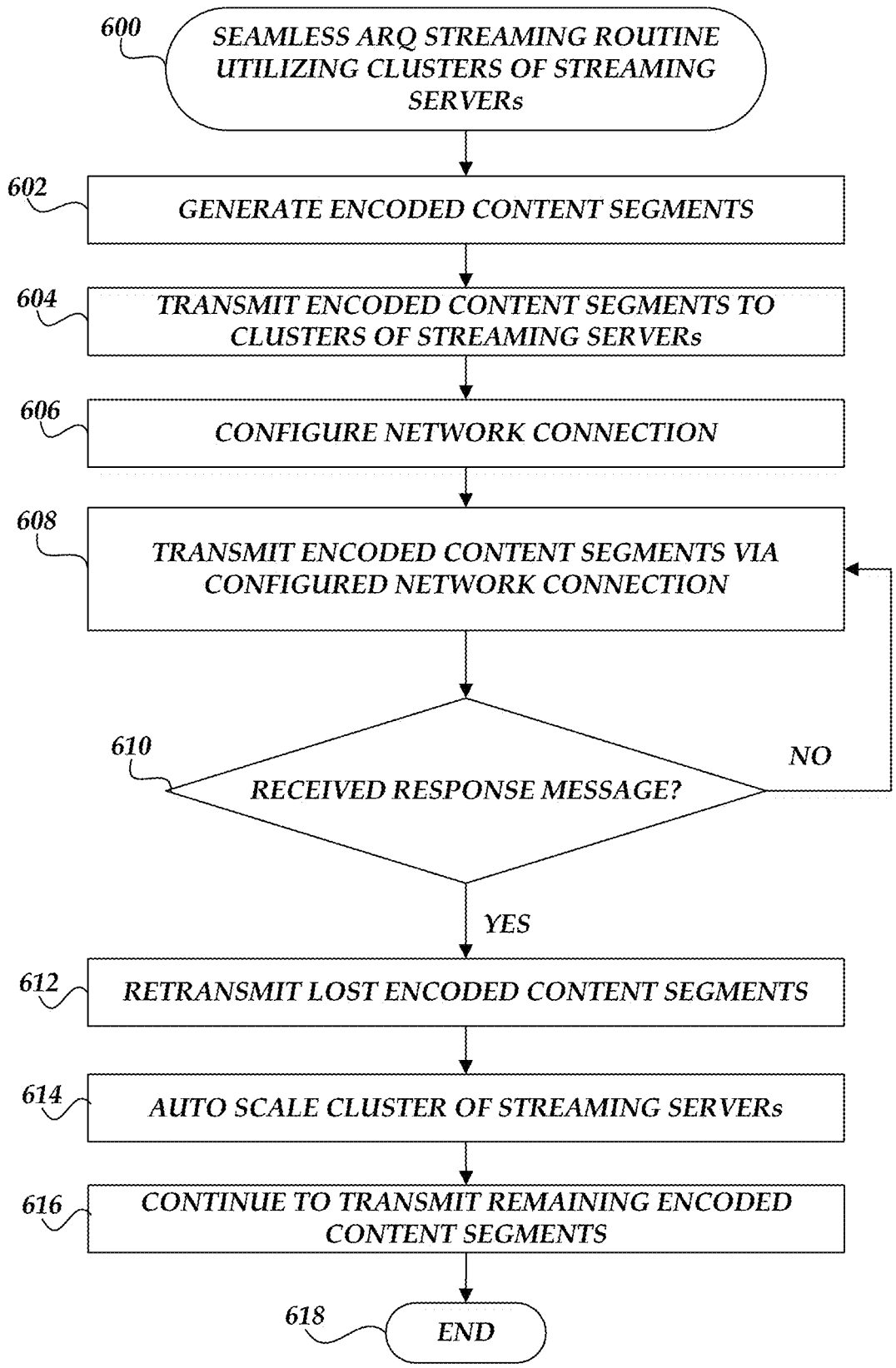
FIG. 6 is a flow diagram illustrative of a seamless ARQ streaming routine by utilizing clusters of streaming servers and implemented by the ARQ streaming service.

Turning now to FIG. 6, a routine 600 for the seamless ARQ streaming routine utilizing clusters of streaming servers will be described. Routine 600 is illustratively implemented by the ARQ streaming service 110.

At block 602, the content streaming service 120 may generate encoded content segments. A content streaming service 120 may include one or more streaming servers for receiving content from original content providers 130 and processing the content to generate a set of received encoded bitrate segments, such as via a video packaging and origination service. In addition, the components of the content streaming service 120 may provide the encoded content to separate stand-alone services, such as streaming service 129, for subsequent transmission to client computing devices 102 and/or the ARQ streamlining service 110. In other embodiments, the illustrated components of the content streaming service 120 may be integrated or form a part of a content delivery service environment. Accordingly, the term content streaming service 120 may generally be variable and is not limited to any particular implementation. The content streaming service 120 may include encoders for encoding the original content received from the original content provider 130 into a bitrate and format for delivery to client computing devices. As the result of encoding the original content, the content streaming service 120 may generate the encoded content segments.

At block 604, the content streaming service 120 may transmit the encoded content segments to the clusters of streaming servers 312A, 312B included in the ARQ streaming service 110. In some embodiments, the ARQ streaming service 110 includes more than one cluster of streaming servers. In these embodiments, the streaming servers are cauterized based on the role of the cluster of streaming servers. For example, the cluster of streaming servers 312A can be configured to transmit the encoded content segments to the client computing device 102. The cluster of streaming servers 312B can be configured to receive a NACK message from the client computing device 102 and retransmit the lost encoded content segments. In some embodiments, the cluster of streaming servers 312A, 312B can form a path between the content streaming service 120 and the client computing device 102. For example, if the ARQ streaming service 110 includes 2 clusters of streaming servers, 312A, 312B, two communication paths can be formed, such that a path via the content streaming service 120, a first cluster of streaming servers 312A, a load balancer 118, and the client computing device 102; and another path via the content streaming service 120, a second cluster of streaming servers 312B, a load balancer 118, and the client computing device 102. In some embodiments, the clusters of streaming servers 312A, 312B may have the same storage size of the data store 116A, 116B included in each cluster of streaming servers 312A, 312B. In some embodiments, the size of the data store 116A, 116B is related to the amount of data that each cluster of streaming servers 312A, 312B can temporarily store while the content streaming service 120 is transmitting the encoded content segments. For example, the ARQ streaming service 110 may designate a certain number of encoded content segments to be temporarily stored in a buffer of the data store 116A, 116B. In this example, when the cluster of streaming servers 312A, 312B receives the encoded content segments from the content streaming service 120, the ARQ streaming service 110 temporarily stores the received encoded content segments in time-based sequence and updates the stored segments when the ARQ streaming service 110 receives a new segment from the content streaming service 120. In some embodiments, the ARQ streaming service 110 may synchronize the number of encoded content segments that can be stored in each data store 116A, 116B of the clusters of streaming servers 312A, 312B. In some embodiments, the ARQ streaming service 110 may modify the number of encoded content segments that can be stored in each data store 116A, 116B based on health of the streaming servers. For example, if the cluster of streaming servers 312A indicates its utilization ratio of the network resource above a threshold, the ARQ streaming service 110 may reduce the amount of the encoded content segments that can be stored in each data store 116A, 116B of the clusters of streaming servers 312A, 312B. This amount of the encoded content segments can generally be referred to as buffer contents. In some embodiments, the buffer of each data store 116A, 116B stores the same amount of buffer contents. In some embodiments, the buffer contents in each data store 116A, 116B are synchronized.

At block 606, the ARQ streaming service 110 may configure the network connection between the clusters of streaming servers 312A and the client computing device 102. In some embodiments, the cluster of streaming servers 312A is configured to transmit the encoded content segments to the client computing device 102. At block 608, the cluster of streaming servers 312A may transmit the encoded content segments to the client computing device 102.

At decision block 610, the ARQ streaming service 110 may determine whether the ARQ streaming service 110 received a response message from the client computing device 102. In some embodiments, the client computing device 102 may transmit a response message to the ARQ streaming service 110. In some embodiments, the response message can be an acknowledgment message or a negative acknowledgment message (NACK) based on message-generating protocol. In some embodiments, the client computing device 102 may transmit the response message to the ARQ streaming service 110 while receiving the encoded content segments. In some embodiments, where the response message is the NACK, the NACK can indicate that the client computing device 102 did not receive one or more encoded content segments, and these segments can be referred to as a lost encoded content segment. For example, the client computing device 102 may confirm the received encoded content segments in real-time or near real-time while receiving from the ARQ streaming service 110 and identify the lost encoded content segments. In this example, when the client computing device 102 did not receive one or more encoded content segments, the client computing device 102 may transmit the NACK to the ARQ streaming service 110. In some embodiments, the NACK may indicate the lost encoded content segments based on the time stamp. For example, the lost encoded content segments can be represented as the segments corresponding to a specific time duration, such as time duration between 33:05-33-08 (minutes:second).

Further at block 610, in some embodiments, the NACK can be transmitted to the cluster of streaming servers 312B. In these embodiments, the cluster of streaming servers 312B can be configured to receive the NACK and retransmit the lost encoded content segments.

Further at block 610, in some embodiments, where the response message is an acknowledgment message, the client computing device may transmit a confirmation of the received encoded content segments. In these embodiments, the ARQ information processing components 114A, 114B may analyze the acknowledgment message and determine the lost encoded content segments. For example, when the client computing device 102 is receiving the encoded content segments from the cluster of streaming servers 312A, the ARQ information processing components 114A may compare the transmitted encoded content segments with the acknowledgment message received from the client computing device 102. In this example, when the ARQ information processing components 114A identifies one or more encoded content segments that transmitted but did not receive the acknowledgment message, the ARQ information processing components 114A may designate these segments as the lost encoded content segments. In some embodiments, the ARQ information processing components 114A may provide the lost encoded content segments to the ARQ information processing components 114B by directly or indirectly communicating with the ARQ information processing components 114B (the direct or indirect communication path between the ARQ information processing components 114A and 114B are not shown in FIG. 3D). If the ARQ streaming service 110 received the response message, the routine 600 proceed to block 612. If the ARQ streaming service 110 did not receive the response message, the routine 600 proceed to block 608.

At block 612, the cluster of streaming servers 312B may retransmit the lost encoded content segments to the client computing device 102. Since the data stores 116A, 116B store the same amount of recently transmitted encoded content segments, the cluster of streaming servers 312B can identify the lost encoded content segments and retransmit the segments to the client computing device 102. For example, if the NACK identifies the lost encoded content segments corresponding to the time period of 33:05-33-08 (minutes:second), the data store 116A and 116B include the same encoded content segments corresponding to the time period of 33:05-33-08 (minutes:second).

At block 614, the ARQ streaming service 110 may auto scale the cluster of streaming servers 312A. The auto scale may represent a process to redistribute the network resources across the cluster of streaming servers 312A. In some embodiments, the ARQ streaming service 110 may perform blocks 612 and 614 parallelly.

At block 616, the cluster of streaming servers 312A may continue to transmit the remaining encoded content segments to the client computing device 102. The routine 600 can be ended at block 618.

The present disclosure is not limited to the embodiments as disclosed above. Various alternative embodiments can be used in some aspects of the present disclosure. For example, in one alternative embodiment, a hybrid client-side secondary event data rendering system can insert the second content into the original content by utilizing both the client computing device and streaming service provider resources (i.e., network computing device resources such as CPUs, GPUs, or streaming servers). Illustratively, some tasks of the processing the original content by inserting the secondary event data can be performed by utilizing the streaming service provider's resources such as streaming servers, GPUs, and CPUs, and the other tasks of the channel branding can be performed by utilizing the client computing devices as disclosed herein. For example, one or more graphics may be inserted into the original content, and the original content with the graphic can be encoded into encoded content segments. In this example, the client may also receive manifest data, including the secondary event instruction for processing the original content by inserting the secondary event data. In addition, the client also may process the original content by utilizing personalized secondary event data and/or the secondary event instructions disclosed in one or more embodiments of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of external computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable external computing device, a device controller, or a computational engine within an appliance, to be name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system to provide a seamless content stream comprising:
    a plurality of streaming servers comprising a first streaming server and a second streaming server configured to transmit input content according to an automatic repeat request (ARQ) streaming protocol and to store a portion of the input content in common among the first and second streaming servers, wherein first streaming server maintains a first buffer storing a portion of the input content and wherein the second streaming server maintains a second buffer storing the portion of the input content;
    at least one load balancer, the at least one load balancer configured to process client computing device requests for streaming content; and
    one or more computing processors and memories associated with the ARQ streaming service, wherein the ARQ streaming service is configured to:
        responsive to received requests for content, trigger the first streaming server from the plurality of streaming servers to transmit the portion of the input content to a client computing device from the first buffer; and
        in response to determining that a response message indicates lost encoded content segments from the portion of the input content, trigger the load balancer to cause retransmission of the lost encoded content segments from the second buffer of the second streaming server.

2. The system of claim 1, wherein the response message includes a negative acknowledgment (NACK) message.

3. The system of claim 1, wherein the ARQ streaming service, subsequent to causing retransmission of the lost encoded content segments, triggers the second streaming server to continue to transmit remaining portions of the input content to the client computing device.

4. The system of claim 1, wherein the ARQ streaming service is configured to monitor a health of individual streaming servers of the plurality of streaming servers, and based on a health of the first streaming server, determine to retransmit the lost encoded content segments from the second streaming server.

5. The system of claim 4, wherein the health of the plurality of streaming servers is measured based on one or more of CPU usage, memory usage, network latency, bandwidth, or uptime.

6. The system of claim 1, wherein the first and second streaming servers are selected based on a determined geographic proximity to the client computing device.

7. The system of claim 1, wherein the ARQ streaming service is configured to determine to retransmit the lost encoded content segments from the second streaming server based on at least one of a performance history, current load, or predicted failure rate of the second streaming server.

8. The system of claim 1, wherein first streaming server is configured to synchronize contents of the first buffer with contents of the second buffer on the second streaming server.

9. A system to provide a seamless automatic repeat request (ARQ) stream comprising:
    a first cluster of streaming servers configured to transmit encoded input content according to an automatic repeat request (ARQ) streaming protocol and to maintain a portion of the input content in a first buffer;
    a second cluster of streaming servers configured to transmit input content according to an automatic repeat request (ARQ) streaming protocol and to maintain the portion of the input content in a second buffer;
    one or more computing processors and memories associated with an automatic repeat request (ARQ) streaming service, wherein the ARQ streaming service is configured to:
        cause the first cluster of streaming servers to transmit the portion of the input content from the first buffer to a client computing device;
        receive a response message from the client computing device indicating a segment of the portion of input content was not received at the client computing device; and
        in response to determining that the response message indicates that the segment was not received at the client computing device, cause retransmission of the segment from the second buffer of the second cluster of streaming servers.

10. The system of claim 9, wherein the response message includes a negative acknowledgment (NACK) message.

11. The system of claim 9, wherein the ARQ streaming service is further configured to scale the first cluster of streaming servers.

12. The system of claim 9, wherein the first and second clusters of streaming servers are selected based on a determined geographic proximity to the client computing device.

13. The system of claim 9, wherein the second cluster of streaming servers is selected based on a determined geographic proximity to the client computing device.

14. The system of claim 9, wherein the first cluster of streaming servers are configured to synchronize contents of the first buffer with contents of the second buffer on the second cluster of streaming servers.

15. A computer-implemented method to provide streaming content comprising:

obtaining, from a client computing device, a request for input content, the input content provided by a content provider and encoded for transmission according to a streaming protocol;

maintaining, at at least a first streaming server and a second streaming server, a buffer including a portion of the input content, wherein buffer corresponds to a first buffer on the first streaming server storing the portion of the input content and a second buffer on the second streaming server storing the portion of the input content;

responsive to the obtained request, causing the first streaming server to transmit the portion of the input content to the client computing device;

receiving a response message from the client computing device indicating a segment of the portion of input content was not received at the client computing device;

monitoring a health of the first streaming server;

based on the health of the first streaming server, determining to retransmit the segment indicated as not received at the client computing device from the second streaming server; and in response to determining that the response message indicates that the segment was not received at the client computing device, causing a retransmission of the segment from the second buffer of the second streaming server.

16. The computer-implemented method of claim 15, wherein the response message includes a negative acknowledgment (NACK) message.

17. The computer-implemented method of claim 15, further comprising, triggering the second streaming server to continue to transmit remaining encoded contents of the input content.

18. The computer-implemented method of claim 15, wherein the first and second streaming servers are selected based at least on geographic proximity to the client computing device, latency, or health of the first and second streaming servers.

19. The computer-implemented method of claim 15, wherein the response message includes an acknowledgment message.

20. The computer-implemented method of claim 19, wherein the first streaming server determines the segment indicated as not received at the client computing device, and wherein the first streaming server provides an indication of the segment indicated as not received at the client computing device to the second streaming server.

21. The computer-implemented method of claim 15 further comprising synchronizing contents of the first buffer with contents of the second buffer.

* * * * *